United States Patent
Prager et al.

(10) Patent No.: US 7,865,538 B2
(45) Date of Patent: Jan. 4, 2011

(54) DESKTOP, STREAM-BASED, INFORMATION MANAGEMENT SYSTEM

(75) Inventors: Randy Prager, New York, NY (US); Peter Sparago, Cheshire, CT (US); Stephen MarcAurele, Meriden, CT (US); David Gelernter, Woodbridge, CT (US); Eric Freeman, Branford, CT (US)

(73) Assignee: Mirror Worlds, LLC, Tyler, TX (US)

( * ) Notice: Subject to any disclaimer, the term of this patent is extended or adjusted under 35 U.S.C. 154(b) by 671 days.

(21) Appl. No.: 11/528,070

(22) Filed: Sep. 26, 2006

(65) Prior Publication Data

US 2008/0228714 A1 Sep. 18, 2008

Related U.S. Application Data

(63) Continuation of application No. 09/892,385, filed on Jun. 26, 2001, now abandoned, and a continuation-in-part of application No. 09/398,611, filed on Sep. 17, 1999, now Pat. No. 6,638,313, which is a continuation of application No. 08/673,255, filed on Jun. 28, 1996, now Pat. No. 6,006,227.

(60) Provisional application No. 60/274,575, filed on Mar. 9, 2001, provisional application No. 60/240,480, filed on Oct. 13, 2000.

(51) Int. Cl.
G06F 17/30 (2006.01)
G06F 12/00 (2006.01)
(52) U.S. Cl. .................................... 707/828; 707/822
(58) Field of Classification Search ................ 715/526; 707/205, 10, 822, 828
See application file for complete search history.

(56) References Cited

U.S. PATENT DOCUMENTS

| 4,586,035 A | * | 4/1986 | Baker et al. | ............... 345/157 |
|---|---|---|---|---|
| 4,831,758 A | | 5/1989 | Williams et al. | |
| 5,031,346 A | | 7/1991 | Herring et al. | |
| 5,060,135 A | | 10/1991 | Levine et al. | |
| 5,063,495 A | | 11/1991 | MacPhail | |
| 5,140,676 A | | 8/1992 | Langelaan | |
| 5,150,410 A | | 9/1992 | Bertrand | |

(Continued)

FOREIGN PATENT DOCUMENTS

JP 6-180661 6/1994

(Continued)

OTHER PUBLICATIONS

User Guide; Mirror Worlds Technologies, Inc. (New Haven, Connecticut).

(Continued)

*Primary Examiner*—Kuen S Lu
(74) *Attorney, Agent, or Firm*—Cooper & Dunham LLP

(57) ABSTRACT

A steam-based document storage and retrieval system accepts documents that are in diverse formats and come from diverse application, automatically creates document model objects describing these documents in a consistent format and associating time stamps with the documents to automatically create a main stream in chronological order. The stream, or sub-streams meeting selected search criteria, are displayed in a variety of forms, including a receding, partly overlapping stack with aids that facilitate user interaction.

27 Claims, 11 Drawing Sheets

U.S. PATENT DOCUMENTS

| | | | |
|---|---|---|---|
| 5,159,669 A | | 10/1992 | Trigg et al. |
| 5,241,671 A | | 8/1993 | Reed et al. |
| 5,247,437 A | | 9/1993 | Vale et al. |
| 5,283,864 A | | 2/1994 | Knowlton |
| 5,287,448 A | | 2/1994 | Nicol et al. |
| 5,297,032 A | | 3/1994 | Trojan et al. |
| 5,299,122 A | * | 3/1994 | Wang et al. ............... 707/1 |
| 5,303,361 A | | 4/1994 | Colwell et al. |
| 5,355,602 A | | 10/1994 | Menke et al. |
| 5,402,526 A | | 3/1995 | Bauman et al. |
| 5,430,710 A | | 7/1995 | Mueller et al. |
| 5,448,729 A | | 9/1995 | Murdock |
| 5,479,602 A | | 12/1995 | Baecker et al. |
| 5,499,330 A | | 3/1996 | Lucas et al. |
| 5,504,852 A | | 4/1996 | Thompson-Rohrlich |
| 5,528,739 A | | 6/1996 | Lucas et al. |
| 5,530,859 A | | 6/1996 | Tobias, II et al. |
| 5,535,063 A | | 7/1996 | Lamming |
| 5,542,086 A | * | 7/1996 | Andrew et al. ............ 707/6 |
| 5,543,088 A | | 8/1996 | Halbirt |
| 5,586,237 A | * | 12/1996 | Baecker et al. ......... 345/670 |
| 5,589,892 A | | 12/1996 | Knee et al. |
| 5,600,833 A | | 2/1997 | Senn et al. |
| 5,603,025 A | * | 2/1997 | Tabb et al. ............... 707/2 |
| 5,613,134 A | | 3/1997 | Lucus et al. |
| 5,616,876 A | | 4/1997 | Cluts |
| 5,621,874 A | | 4/1997 | Lucas et al. |
| 5,621,906 A | | 4/1997 | O'Neill et al. |
| 5,625,818 A | | 4/1997 | Zarmer et al. |
| 5,649,182 A | | 7/1997 | Reitz |
| 5,649,188 A | | 7/1997 | Nomura et al. |
| 5,701,582 A | | 12/1997 | DeBey |
| 5,724,567 A | | 3/1998 | Rose et al. |
| 5,729,730 A | | 3/1998 | Wlaschin et al. |
| 5,737,737 A | * | 4/1998 | Hikida et al. ............ 707/104.1 |
| 5,758,324 A | | 5/1998 | Hartman et al. |
| D395,297 S | | 6/1998 | Cheng et al. |
| 5,764,972 A | | 6/1998 | Crouse et al. |
| 5,778,364 A | | 7/1998 | Nelson |
| 5,784,620 A | * | 7/1998 | Isham ...................... 719/316 |
| D398,299 S | | 9/1998 | Ballay et al. |
| 5,835,129 A | | 11/1998 | Kumar |
| 5,835,789 A | * | 11/1998 | Ueda et al. ............... 710/33 |
| 5,890,177 A | | 3/1999 | Moody et al. |
| 5,905,992 A | | 5/1999 | Lucas et al. |
| 5,912,668 A | | 6/1999 | Sciammarella et al. |
| 5,937,417 A | * | 8/1999 | Nielsen .................... 715/207 |
| 6,006,227 A | * | 12/1999 | Freeman et al. ......... 707/7 |
| 6,012,072 A | | 1/2000 | Lucas et al. |
| 6,012,074 A | | 1/2000 | Lucas et al. |
| 6,151,610 A | | 11/2000 | Senn et al. |
| 6,178,409 B1 | * | 1/2001 | Weber et al. ............. 705/79 |
| 6,199,082 B1 | * | 3/2001 | Ferrel et al. ............. 715/205 |
| 6,202,058 B1 | | 3/2001 | Rose et al. |
| 6,639,876 B2 | | 3/2001 | Kalis et al. |
| 6,243,724 B1 | * | 6/2001 | Mander et al. ........... 715/273 |
| 6,262,732 B1 | | 7/2001 | Coleman et al. |
| 6,396,513 B1 | | 5/2002 | Helfman et al. |
| 6,401,097 B1 | | 6/2002 | McCotter et al. |
| 6,457,017 B2 | | 9/2002 | Watkins et al. |
| 6,466,237 B1 | | 10/2002 | Miyao et al. |
| 6,496,857 B1 | | 12/2002 | Dustin et al. |
| 6,523,048 B2 | | 2/2003 | DeStefano |
| 6,638,313 B1 | | 10/2003 | Freeman et al. |
| 6,714,489 B2 | | 3/2004 | Kalis et al. |
| 6,725,427 B2 | | 4/2004 | Freeman et al. |
| 6,768,999 B2 | | 7/2004 | Prager et al. |

FOREIGN PATENT DOCUMENTS

WO  WO2003/001345 A1  1/2003

OTHER PUBLICATIONS

Cowart, Mastering Windows 3.1, 1992, chapter 12, pp. 396-417, Jan. 1, 1992.

Freeman, Lifestreams Project Home Page 3 pages, 1994-1996, Jan. 1, 1994 (*not available*).

Freeman, Lifestreams for the Newton, Steve Mann's Developers Corner, Oct. 31, 1995, 5 pages.

Freeman et al., Lifestreams: Organizing your Electronic Life, AAAI Fall Symposium, AI Applications in Knowledge Navigation and Retrieval, Nov. 30, 1995, Cambridge, MA, 6 pages.

Landsdale, M., The psychology of Personal Information Management, Applied Ergonomics, (Mar. 1988): pp. 55-66.

Malone, Thomas W., How Do People Organize Their Desks? Implications For The Design Of Office Information Systems, ACM Transaction On Office Systems, vol. 1, No. 1 (Jan. 1983): pp. 99-112.

Nelson, Theodor H., The Right Way to Think About Software Design, In The Art of Human-Computer Interface Design, Brenda Laurel, (Ed.), (1990): pp. 235-243.

Steinberg, Lifestreams, WIRED 5.02, Feb. 28, 1997, 11 pages.

Getting Results with Microsoft Outlook, copyright Microsoft Corporation 1995-1996, pp. 28-29, Jan. 1, 1995.

User Guide; Mirror Worlds Technologies, Inc. (New Haven, Connecticut) (*not available*).

Gobel, David P., Using Lotus Magellan, Que Corporation (1989).

Retrospect User's Guide, version 3, first edition, Dantz Development Corporation (1989-1995).

Rose, Daniel E., et al., "Content Awareness in a File System Interface: Implementing the 'Pile' Metaphor for Organizing Information", ACM-SIGIR '93 (1993).

Mander, Richard, et al., "A 'Pile' Metaphor for Supporting Casual Organization of Information", ACM-CHI '92 (May 3-7, 1992).

HyperCard Basics and HyperCard Stack Design Guidelines, Apple Computer, Inc. (1990).

"The 'Lifestreams' Approach to Reorganizing the Information World", YALEU/DCS/TR-1070 (1995).

Gifford, David K., et al., "Semantic File Systems", ACM-SFS '91 (1991).

"On Location 2.0.01" by ON Technology (1990-1991).

Bolour, A., et al., "The Role of Time in Information Processing: A Survey", ACM-SIGART Bulletin, Issue 80 (Apr. 1982).

Rahm, Erhard, "Recovery Concepts for Data Sharing Systems" IEEE (1991).

Inside Macintosh, Addison-Wesley Publishing Company (Aug. 1992).

O'Toole, James W., et al., "Names should mean What, not Where" (1992).

Staples, Loretta, "Representation in Virtual Space: Visual Convention in the Graphical User Interface", ACM-Interchi '93 (Apr. 24-29, 1993).

Goldberg, David., et al., "Using collaborative filtering to weave an information Tapestry", Assocation for Computing Machinery, Inc. (1992).

Gelernter, David, "The Cyber-Road Not Taken", The Washington Post (Apr. 3, 1994).

Solomon, Gitta, "Piles Metaphor ATG" (video), Apple Computer, Inc., Mar. 1992.

"Spatial Data Management System" (video), MIT, Jan. 1980.

Milash, Brett, et al., "Lifelines: Visualizing Personal Histories" (video), University of Maryland, Apr. 1995.

Lucas, Peter, "CHI '94 Video" (video), MAYA Design Group, CHI '94, 1994.

Lucas, Peter, "Workscape Video" (video), http://www.youtube.com/watch?v=H5-T_S50Sr4 (screen capture video), (1993).

"200 Points of Light" (video), http://www.youtube.com/watch?v=H9F17JrG-SE (screen capture video), (1990).

W3C: A Little History of the World Wide Web, http://www.w3.org/History.html, (Accessed Jul. 15, 2010).

Gelernter, David, "The Cyber-Road Not Taken", The Washington Post, Apr. 3, 1994.

Bolt, Richard A., "Spatial Data-Management", Massachusetts Institute of Technology, 1979.

Lansadale, M.W., et al., "Memoirs: A personal Multimedia Information System", The Proceedings of the Fifth Conference of the British Computer Society Human Computer Interaction Specialist Group University of Nottingham, Sep. 1989.

Pemberton, Steven, "Not With a Whimper", SIGCHI, Apr. 1998.

Miller, James R., "The Apple Advanced Technology Group - An Introduction to the Special SIGCHI Bulletin Issue", SIGCHI, Apr. 1998.

Russell, Daniel M., "The ATG Knowledge Management Technologies Laboratory", SIGCHI, Apr. 1998.

Miller, James R., "An Overview of the ATG Intelligent Systems Program", SIGCHI,' Apr. 1998.

Miller, James R., et al., "From Documents to Objects: An Overview of LiveDoc", SIGCHI, Apr. 1998.

Bonura, Thomas, et al., "Drop Zones: An Extension to LiveDoc", SIGCHI, Apr. 1998.

Boguraev, Branimir, et al., "An Architecture for Content Analysis of Documents and Its Use in Information and Knowledge Tasks", SIGCHI, Apr. 1998.

Boguraev, Branimir, et al., "Dynamic Document Presentation", SIGCHI, Apr. 1998.

Nardi, Bonnie, et al., "An Online Digital Photography Course for High School Teachers", SIGCHI, Apr. 1998.

Shulka, Shilpa V., "Hit Squads & Bug Meisters", SIGCHI, Apr. 1998.

Rose, Daniel E., "Beyond Search: The Information Access Research Group at Apple", SIGCHI, Apr. 1998.

Russell, Daniel M., "User Experience Research Group", SIGCHI, Apr. 1998.

Walker, William F., Rapid Prototyping of Awareness Services Using a Shared Information Server, SIGCHI, Apr. 1998.

Bellegarda, Jerome R., "Interaction-Driven Speech Input", SIGCHI, Apr. 1998.

Machiraju, N. Rao, "The ATG Learning Communities Laboratory: An Overview", SIGCHI, Apr. 1998.

Bellamy, Rachel, et al., "Learning Conversations", SIGCHI, Apr. 1998.

Houde, Stephanie, et al., "In Search of Design Principles for Tools and Practices to Support Communication Within a Learning Community", SIGCHI, Apr. 1998.

Roddy, Brian J., et al., "Interface Issues in Text Based Chat Rooms", SIGCHI, Apr. 1998.

Spohrer, Jim, "ATG Education Research: The Authoring Tools Thread", SIGCHI, Apr. 1998.

Graves, Mike, et al., "Unfamiliar Ground: Designing Technology to Support Rural Healthcare in India", SIGCHI, Apr. 1998.

Mountford, S. Joy, "A History of the Apple Human Interface Group", SIGCHI, Apr. 1998.

Harris, Jed, et al., "Discourse Architecture", SIGCHI, Apr. 1998.

Singer, Samuel Weller, "Researches into the History of Playing Cards", Printed by T. Bensley and Son, 1816.

"Playing Poker at Egan's" (image), http://www.orww.org/Harney_Cattle/Student_Reports/Images/11-Poker_1882.jpg (ca. 1882).

"Commercial America", Philadelphia Commercial Museum, Jul. 1911.

"Eleventh Annual Report of the Trustees of the Boston State Hospital", Published by Wright & Potter Printing Co., 1920.

"System - The Magazine of Business", A.W. Shaw Company, 1921.

Ibberson, J.R., Md, "The Business Side of General Practice", Canad. M.A.J., vol. 72, Apr. 15, 1955.

Carlbom, Ingrid, et al., "Planar Geometric Projections and Viewing Transformations", Computing Surveys, vol. 10, No. 4, pp. 465-502, Dec. 1978.

Schmandt, Christopher Martin, "Pages Without Paper", Bachelor of Science Thesis at the Massachusetts Institute of Technology, Dec. 1978.

Donelson, William C., "Spatial Management of Information", Architecture Machine Group, Massachusetts Institute of Technology, Proceedings of the 5th Annual Conference on Computer Graphics and Interactive Techniques, 1978.

Bolt, Richard A., "Put-That-There": Voice and Gesture at the Graphics Interface, Architecture Machine Group, Massachusetts Institute of Technology, ACM, 1980.

Halasz, Frank, et al., "Analogy Considered Harmful", Association for Computing Machinery, 1981.

Bolt, Richard A., "Gaze-Orchestrated Dynamic Windows", Architecture Machine Group, Massachusetts Institute of Technology,, Cambridge Massachusetts, ACM, Computer Graphics, vol. 15, No. 3, Aug. 1981.

Williams, Gregg, "The Lisa Computer System", BYTE Publications, Inc., Feb. 1983.

Williams, Gregg, "The Apple Macintosh Computer", BYTE Publications, Inc., Feb. 1984.

Anderson, John J., "Atari 520ST: A Reborn Atari Once Again Points the Way to the Next Generation", Creative Computing, vol. 11, No. 10, Oct. 1985.

Greenberg, Saul, et at, "Issues and Experiences in the Design of a Window Management System", Canadian Information Processing Society - Edmonton Conference, 1986.

Henderson, D. Austin, Jr., et al., "Rooms: The Use of Multiple Virtual Workspaces to Reduce Space Contention in a Window-Based Graphical User Interface", ACM Trans. On Graphics, vol. 5, No. 3, pp. 211-243, Jul. 1986.

Robek, Mary F., et al., "Information and Records Management", 3rd ed., Glencoe Publishing Co., pp. 160-163, 179-181, 192-193, 224-229, 248-251, (1987).

Lynch, Vincent, "American Jukebox - The Classic Years", Chronicle Books, pp. 36, 74-75, (1990).

Robertson, G. G., et al., "Cone Trees: Animated 3D Visualizations of Hierarchical Information", UIR-R-1991-06, (1991).

Card, S. K., et al., "The Information Visualizer: An Information Workspace", UIR- R-1991-01, (1991).

MacKinlay, Jock D., et al., "The Perspective Wall: Detail and Context Smoothly Integrated", UIR-R-1991-03, (1991).

Kay, Alan C., "The Early History of Smalltalk", ACM SIGPLAN Notices, vol. 28, No. 3, Mar. 1993.

Adams, Michael, et al., "Jukeboxes", Schiffer Publishing, Ltd., pp. 85-86, 103-104, 105, (1996).

Card, Stuart K., et al., "The WebBook and the Web Forager: An Information Workspace for the World-Wide Web", CHI '96 Conference on Human Factors in Computing Systems, Apr. 13-18, 1996.

Meyers, Brad A., "A Brief History of Human-Computer Interaction Technology", Interactions, pp. 44-54, 1998.

Bardini, Thierry, "Bootstrapping", Stanford University Press, Chapter 6, pp. 143-181, (2000).

Sutherland, Ivan Edward, "Sketchpad: A Man-Machine Graphical Communication System", PhD Dissertation at the Massachusetts Institute of Technology, Jan. 1963.

Engelbart, Doug, "The Click Heard Round the World", Wired Magazine, 2004.

Reimer, Jeremy, "A History of the GUI", arstechnica.com, May 5, 2005.

"The Library of Congress Classification System", Aug. 2006.

Barnes, Susan B, "Alan Kay: Transforming the Computer into a Communication Medium", IEEE Annals of the History of Computing, 2007.

Calamar, Gary et al., "Record Store Days: From Vinyl to Digital and Back Again", Sterling Publishinj Co., 2009.

Masinter, Larry, "Document Management, Digital Libraries and the Web", Jun. 9, 1995.

Herot, Christopher F., "Spatial Management of Data", Computer Corporation of America, ACM Trans. On Database Systems, vol. 5, No. 4, pp. 493-514, Dec. 1980.

Newman, William M., "A System for Interactive Graphical Programming", Harvard University, ACM Spring Joint Computer Conference, 1968.
Schultz, Jan R., et al., "An Initial Operational Problem Oriented Medical Record System - for Storage, Manipulation and Retrieval of Medical Data", University of Vermont, ACM Spring Joint Computer Conference, 1971.
Apple Macintosh (screenshot image).
Carriero, Nicholas, et al., "Bauhaus Linda", Department of Computer Science, Yale University.
"Small Talk on the Alto" (image).
Donelson, William C., "Spatial Management of Data", Massachusetts Institute of Technology, 1977.
"Lotus Magellan Explorer's Guide", Lotus Development Corp., 1989.
Factor, Michael, et al., "Real-Time Data Fusion in the Intensive Care Unit", Yale University, Nov. 1991.
Gelernter, David, et al., "Graphics Interfaces & Sensor Activator Extensions for the Process Trellis Software", Yale University, Oct. 31, 1995.
"Lifestream" (image), 1995.
Harrison, Beverly L., et al., "Timelines: An Interactive System for the Collection and Visualization of Temporal Data", Proceedings of Graphic Interface '94, pp. 141-148, (1994).
"IBM OS2" (screenshot image).
Gerlenter, David, "Applications and Systems for Large Scale Adaptive Parallelism", Mar. 22, 1997.
Date, C. J., "An Introduction to Database Systems, 3rd ed., The Systems Programming Series, vol. 1", IBM Corporation, Addison-Wesley Publishing Company, 1981.
"The Billboard" (magazine), Jan. 26, 1946.
"Billboard" (magazine), Jul. 4, 1992.
"Library of Congress Classification" (accessed May 6, 2010).
Swineheart, Daniel C., et al., "A Structural View of the Cedar Programming Environment", ACM Trans. On Programming Languages and Systems, vol. 8, No. 4, Oct. 1986.
"Commodore Amiga 1000 Computer" (screenshot image).
"Atari 520ST Computer" (screenshot image).
Lucas, Peter, et al., "Workscape: A Scriptable Document Management Environment", Maya Design Group, Conference Companion CHI '94, Apr. 1994.
Bailay, Joseph M., "Designing Workscape: An Interdisciplinary Experience", Maya Design Group, Conference Companion CHI '94, Apr. 1994.
Perkins, Roderick, et al., "Inventing the Lisa User Interface", Interactions, pp. 40-53, (1997).
Feiner, Steven, et al., "An Experimental System for Creating and Presenting Interactive Graphical Documents", ACM Trans. On Graphics, vol. 1, No. 1, pp. 59-77, Jan. 1982.
Houde, Stephanie, "Iterative Design of an Interface for Easy 3-D Direct Manipulation", CHI '92, May 1992.
"Announcing Retrospect and Retrospect Remote 3.0", Business Wire, Aug. 8, 1995.
"Dantz Delivers Retrospect Archives", MacWEEK, Inc., Jun. 10, 1989.
"Archiving Easy on Retrospect: Uniform Interface to Storage Devices", MacWEEK, Inc., Feb. 21, 1989.
"Mac the Knife, GMBH Rumors", MacWEEK, Inc., Jan. 31, 1989.
"Dantz, ChrisMac drive over to CD-R", MacWEEK, Inc., Dec. 11, 1995.
"System 7.5.2 Fixes", MacWORLD, Oct. 1, 1995.
"Dantz to Waltz in with Friendlier Retrospect", MacWEEK, Inc., Jul. 31, 1995.
"Dantz Eases Network Backup", InfoWorld, Jan. 11, 1993.
"Retrospect User's Guide", 1st Ed., Dantz Development Corporation, 1989.
"Retrospect User's Guide", 2nd Ed., Dantz Development Corporation, 1993.
"Rowe CD100b Jukebox" (image).

Spence, Robert, et al., "Data Base Navigation: An Office Environment for the Professional", Behavior and Infotutation Technology, vol. 1, No. 1, pp. 43-54, (1982).
Johnson, Jeff, et al., "The Xerox Star: A Retrospective", IEEE Computer, Sep. 1989.
Shneiderman, Ben, "The Eyes Have It: A Task by Data Type Taxonomy for Information Visualizations", University of Maryland, Proc. Visual Languages, Sep. 1996.
Rittsteiger, Andreas, "AMI Jukeboxes" (images).
*Apple Computer Inc.* v. *Microsoft Corporation*, 35 F.3d 1435 (9th Cir. 1994).
Windows 1.0 (screenshot image).
Windows 2.0 (screenshot image).
Windows 3.0 (screenshot image).
Windows 95 (screenshot image).
Windows NT3.1 (screenshot image).
Plaisant, Catherine et al. "Lifelines: Visualizing Personal Histories", ACM CHI '96 Conference Proc., pp. 221-227, color plate 518, Apr. 1996.
Musthaler, Linda, "A Tall Order for Document Managers", Network World, pp. 35- 40, Jul. 18, 1994.
Seiden, Peggy, et al., "Information Retrieval Systems for Microcomputers", Library Hi Tech, vol. 3, Issue 1, pp. 41-54, (1985).
"Zylab Includes Auto-Indexing in Zyindex 3.0", InfoWorld, vol. 10, Issue 18, p. 16, May 2, 1988.
Kappes, Sandra, et al., "Document Management for the Knowledge Worker System", US Army Corps of Engineers, USACERL ADP Report 95/38, Nov. 15, 1995.
"Verity K2 Toolkit Search System Administration Guide V2.2", Verity Incorporated, Jul. 20, 2000.
Cleveland, Gary, "Overview of Document Management Technology", International Federation of Library Associations and Institutions Universal Dataflow and Telecommunications Core Programme, Jun. 1995.
Factor, Michael, et al., "The Trellis Architecture for Intelligent Monitors", Department of Computer Science, Yale University, 1990.
Bush, Vannevar, "As We May Think", Life Magazine, Sep. 10, 1945.
Lansadale, M.W., et al., "MEMOIRS: A personal Multimedia Information System", Elseiver Science Publishers B.V., 1989.
Lansadale, M.W., et al., "MEMOIRS: A personal Multimedia Information System", 1995.
Bush, Vannevar, "As We May Think", The Atlantic Monthly, Jul. 1945.
"On Location Manual, v. 1.0", On Technology, Inc., 1990.
Coolidge, C. M., "Dogs Playing Poker (His Station and Four Aces)" (image), 1903.
Musthaler, Linda, "DMS's getting mix-and-match wardrobe," Network World, pp. 38-41, Jan. 8, 1996.
Kullberg, Robin Lee, "Dynamic Timelines: Visualizing Historical Information in Three Dimensions", Massachusetts Institute of Technology, 1995.
USDC - EDTX 6:08-cv-88 *Led Mirror Worlds* v. *Apple Inc.*; Dkt# 221 Apple Inc's Motion for Summary Judgement (partially redacted).
USDC - EDTX 6:08-cv-88 *Led Mirror Worlds* v. *Apple Inc.*; Dkt# 221-25 Expert Rebuttal Report of John Levy, Ph.D. (partially redacted).
USDC - EDTX 6:08-cv-88 *Led Mirror Worlds* v. *Apple Inc.*; Expert Report of Steven K. Feiner, PhD. (confidential).
*Mirror Worlds, LLC* v. *Apple, Inc.* Memorandum Opinion and Order Docket Entry No. 302 dated Aug. 11, 2010.
*Mirror Worlds, LLC* v. *Apple, Inc.* Mirror Worlds, LLC Notice of Dismissal with Prejudice of Certain Infringement Claims Docket Entry No. 359 dated Sep. 1, 2010.
*Mirror Worlds, LLC* v. *Apple, Inc.* Mirror Worlds, LLC Defendant and Counterclaim Plaintiff Apple Inc's Notice of Asserted Prior Art for Trial Docket Entry No. 365 dated Sep. 6, 2010.
*Mirror Worlds, LLC* v. *Apple, Inc.* Memorandum Opinion and Order Docket Entry No. 385 dated Sep. 16, 2010.
*Mirror Worlds, LLC* v. *Apple, Inc.* Verdict form dated Oct. 1, 2010.

* cited by examiner

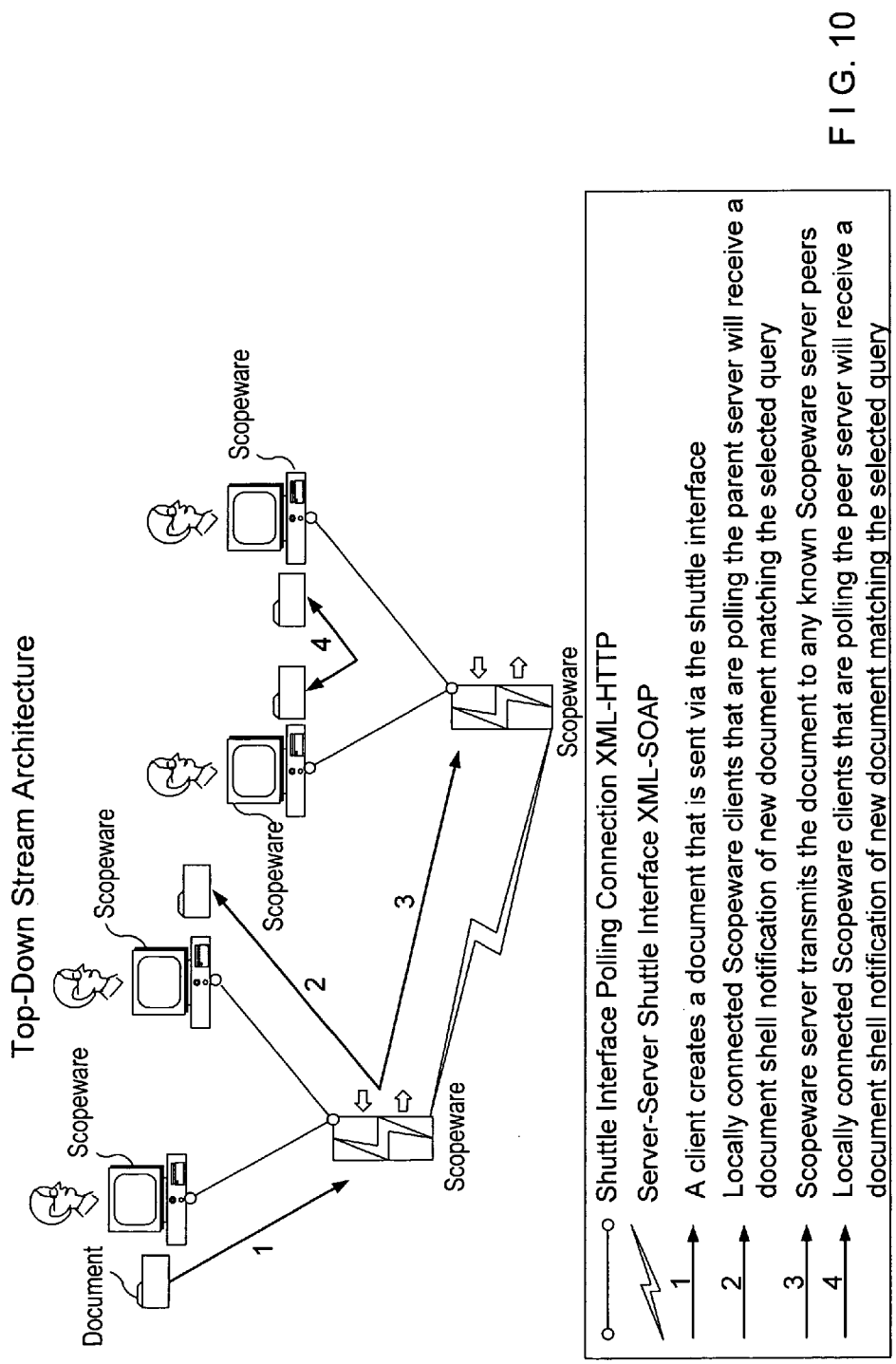

DESKTOP, STREAM-BASED, INFORMATION MANAGEMENT SYSTEM

CROSS-REFERENCE TO RELATED APPLICATIONS

The application is a continuation of Ser. No. 09/892,385, filed Jun. 26, 2001 now abandoned, which (1) claims the benefit of provisional applications 60/274,575 filed Mar. 9, 2001 and 60/240,480 filed Oct. 13, 2000, (2) is a continuation-in-part of patent application Ser. No. 09/398,611 filed Sep. 17, 1999 now U.S. Pat. No. 6,638,313, which in turn is a continuation of patent application Ser. No. 08/673,255 filed Jun. 28, 1996 and now U.S. Pat. No. 6,006,227, and (3) hereby incorporates by reference said prior applications in their entireties, as though fully set forth herein.

INCORPORATION BY REFERENCE OF MATERIAL ON COMPACT DISC

This patent specification incorporates by reference the contents of the compact disc attached hereto in duplicate (Copy 1 and Copy 2). Each disc is labeled in accordance with Rule 1.53(e)(6), with the collective names Scopeware 2.0 and Vision 1.0. The date of creation of the files on the disc is Jun. 25, 2001. The computer code on the compact disc was generated from correspondingly named source code. The names of individuals files on the disc within these collective names, as well as the size of he individual files, are identified in the list of files attached as an appendix to this specification. The contents of the compact disc submitted herewith in duplicate and the contents of the list of files attached as an appendix to this specification are hereby incorporated by reference in this application as thought fully set forth herein.

FIELD

This patent specification is in the field of systems for handling information by computer and more specifically relates to an enhanced system for handling heterogeneous items of information to store, manage, customize, organize and/or deliver such information regardless of its source and type in particularly efficient, easy-to-use, and intuitively understood.

BACKGROUND AND SUMMARY

Traditional information management systems store and retrieve documents on the basis of attributes such as the name and storage location of a document. This, however, can get very unwieldy in typical usage, as more and more names and locations of documents become a part of the storage and retrieval scheme. Although it is possible in some cases to search or order documents by other attributes, such as content and time of creation or revision, it may still be necessary to specify which file folders, directories, or storage devices to search. If a user no longer remembers how a particular item of information was stored in a traditional system, it may be difficult or impractical to retrieve it efficiently.

In an effort to alleviate these and other concerns with traditional storage and retrieval systems, and to provide a more effective and natural approach that better fits the way people tend to work with and think of items of information, a new system described herein uses approaches that rely primarily on an intuitive, time-associated way of dealing with information. The system is stream-based in that it creates time-ordered streams of information items or assets, beginning with the oldest and continuing through current and on to future items. An information item or asset in this system can be any type—a file, an email message, bookmark, IRL, memo, draft, scanned image, calendar note, photo, shopping list, voicemail, rolodex or business card, a video clip, etc. When a user tunes in a stream, ordinarily a receding parade of documents appears on the screen. The closest are nearest in time. When a new document arrives, for example when a new email message comes in, it appears at the head of the stream, at the front of the parade. (When a newer message arrives, it steps in front of the parade.) Further-away documents are older.

Ordinarily, a user stands at the line current in time and looks into the past, but the stream also extends into the future. If the user has a meeting next Tuesday at 10 AM, a note to that effect goes into the stream's future, and a note about a meeting Wednesday goes in the stream in front of the note about next Tuesday. Documents in the stream flow steadily onward, as time does. Documents in the future part of the stream flow toward the present; documents in the present flow toward the past. Newly arriving documents push older documents further into the past.

The receding parade of documents is an efficient way to present information on a computer screen. The display uses foreshortening for a perspective effect to pack more information into limited space. For easy browsing, when the user touches a document on the screen with the cursor, a summary of that document with a thumbnail vies appears immediately, without requiring clicking or other user action, as a browse card—a dedicated small window besides the receding parade of time ordered documents. The user controls the displayed stream with VCR-type controls, to move forward or back, to go toward or to the beginning or the end of time in the stream, to now, or to any date or time, past or future.

An item of information in a stream need not be given a name, or a designation of storage location. In a traditional system, a requirement that all documents have names can have implications beyond the necessity of inventing and remembering names. For example, emails may not have names of their own but may need to be stashed inside some other file; to search for an email the user may need to go to this special mail file and search that file. In the system disclosed here, items of information such as emails do not need to be named and can be searched along with any other types of information items.

Searches in the disclosed system can be by a combination of three methods, search, browse, and time-order.

Time-order in itself often makes it possible to locate documents. Often the user needs a document that showed up recently, this morning, or two days ago, or at some time that can be pinned down with some degree of accuracy. Time-order together with browsing through the stream (and its glance views) makes it possible to glance quickly through the documents that are from the approximate time of interest and quickly pull out the right one. (While traditional systems can time-order documents it often is difficult to intersperse in the list all recent emails, news updates, bulletin-board postings, URLs and other documents, let alone voicemail messages. Without a browse feature for a stream as disclosed herein, such a list can be of little value, whereas with browse and an all-encompassing stream that gets updated promptly with new material, one can sweep over large numbers of documents, get instance glances (summary, thumbnail, etc.) of each and find the right one fast.)

When searching in a stream in the disclosed system, the user gets a new stream—a substream. One can search on any word or phrase, as every word in every document is indexed, on document types and metadata, and on time-related data (e.g., show me all email from last March). If the user searches for an entity called Schwartz Bottling, the new substream will the narrative or documentary history of all dealings with that entity—first contacts, subsequent internal documents or communications, reports, calendar items, and so on.

A substream in the disclosed system is in some ways similar to a folder or directory in a traditional system. Instead of a "Schwartz Bottling" folder in which the user has put documents by so naming them, he/she has created a substream with those document, and can save it for later use or create it again as needed. The substream can do all a folder can but is much more powerful than a folder. A substream collects documents automatically; the use r has to put documents in a folder by hand, one by one. A substream can persist in that it continues to trap newly created or received documents that match it. If a user looks at the "Schwartz Bottling" substream tomorrow, she/he may find it has grown to include a new email or other documents that were interspersed automatically. A substream can tell a story, and include the future. A substream is non-exclusive, in that a document can belong to many substreams. A folder in a traditional system imposes on computers many of the obsolete, irrelevant limitations of a physical filing cabinet drawer or folder. A substream is an organizational tool that can make more efficient use of computer characteristics than an analog of filing an retrieving physical documents.

One reason for the efficiency of the disclosed system is that it handles all types of different documents, or items of information, in essentially the same way, even if the document is of a type or format unknown to the system. Each document when created, received or otherwise encountered is treated consistently according to a universal Document Object Model (DOM). As described below in more detail, the system processes the document to create its Document Object Modes that includes various aids such as significant information about the document including items such as summary, type of document, thumbnail of the document, who is the document owner, who has permission to access the document, keywords, command options, time stamp, index, etc. This creation of a document's DOM is done automatically, although the user can aid the process. It can be done by a translator agent or programmatically.

The system creates a glance view or browse card of each document that has the same overall format to make searching for and working with a document more intuitive but also is specific to the documents in many ways. One important difference from traditional systems is that the browse card has command buttons that match the type of documents. While the command set for traditional systems may use the same command button set for different types of documents, in the disclosed system the command set that shows in the displayed browse card is specific to the document—it has the unique combination of command buttons that make sense for that document. The command buttons unique to the browse card can be shown on the card itself or separately.

The browse card comes on the screen automatically when the cursor is over the corresponding document in the displayed stream; the user need not take any other action such as clicking on the document or taking an action calling a program that can open or work with the document.

The universal DOM of a document is created automatically as a new document of any type is added to the basic stream of information items. It is done for any existing, legacy documents, when the system is first installed on a computer, and is done as any additional documents are created or otherwise come in. Metadata such as owner, date, access permission and keywords are created as part of this automatic process.

Access permission is a part of a document's metadata, so permission levels need have the constraints of traditional information handling systems where a group or an individual typically has access to all documents in a particular folder or directory, or has a particular type of access to a folder.

Search results are integrated into a substream, at the right place, when and as they become available. The user can start using an incomplete substream and watch it build up. If the search must extend over a number of computers or even servers, and some are unavailable at the time, the results that come in when any become available are integrated into the substream at the right places.

BRIEF DESCRIPTION OF THE DRAWINGS

FIGS. 9 and 10 are examples of configurations in a preferred embodiment.

DETAILED DESCRIPTION OF PREFERRED EMBODIMENTS

Figure 1:
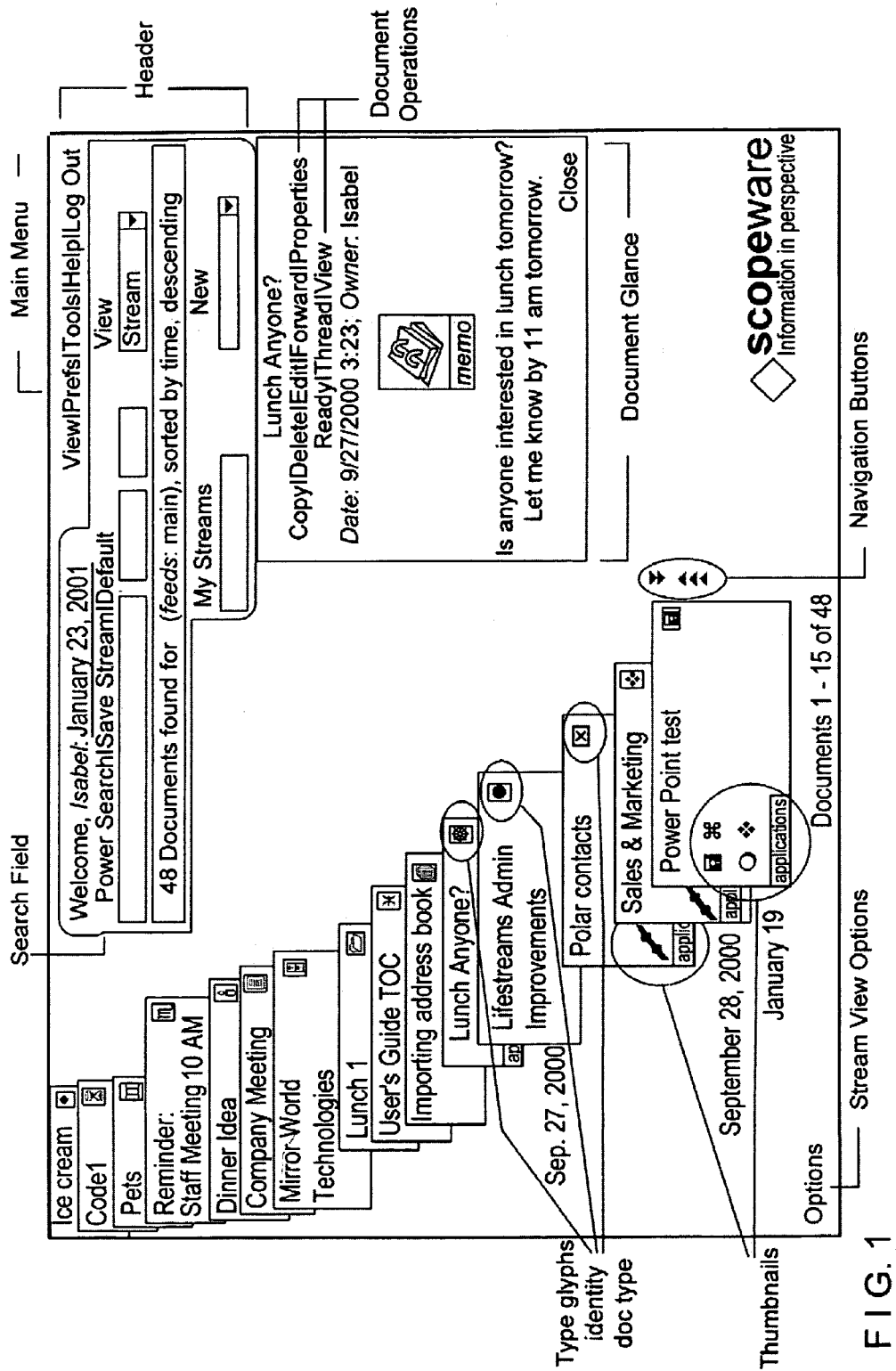
FIG. 1 illustrates a screen that can serve as a default view when a software product according to a preferred embodiment is opened on a computer; the labels that are added are not normally a part of the displayed screen.

FIG. 1 illustrates a default screen seen on a PC or other equipment working with the disclosed system. It can show up upon turning on the computer, or upon calling the disclosed system. As seen in FIG. 1, the screen illustrates a receding stream of documents, with the most recent documents at the front. Passing the cursor over a document in the stream causes that document's "glance view" or "browse card" to appear on the screen. The glance view of a document is so labeled in FIG. 1. The screen also includes the following features appropriately labeled in FIG. 1: (a) the Search Field is an area in which the user can type one or more words for which the system will search in documents (information assets) in the displayed part of the stream and/or in additional information assets that might not be displayed; (b) the Main Menu is where the user sets preferences, finds help information, logs out, and/or performs other operations; (c) the Header contains information such as links, command buttons and choice boxes used to navigate; (d) the Stream View Options allow the user to configure the presentation of the stream of information assets; (e) the Document Glance allows quick scanning of information assets that are visible on the screen, and presentation of more detailed information on the selected information asset; (f) the Type Glyphs identify the nature of an information asset at a glance (e.g., a Word document); and (g) the Thumbnails is a graphic representation of the type of document (e.g., an audio file, an email, an event, etc.). The User Guide published by the assignee hereof (a copy is submitted concurrently with the filing of this application with an IDS form) further describes the operation of a relevant example and, together with the programs contained in the compact disc submitted herewith, provides a more detailed disclosure of a preferred embodiment.

Certain particularly novel features of the disclosed system are described below by reference to flowcharts and block diagrams. More detailed information on a particular example of implementation of these and other features of the system are evident from the software on the attached compact disc, which is the best mode known to the inventors at the time of filing this patent application.

Figure 2A:
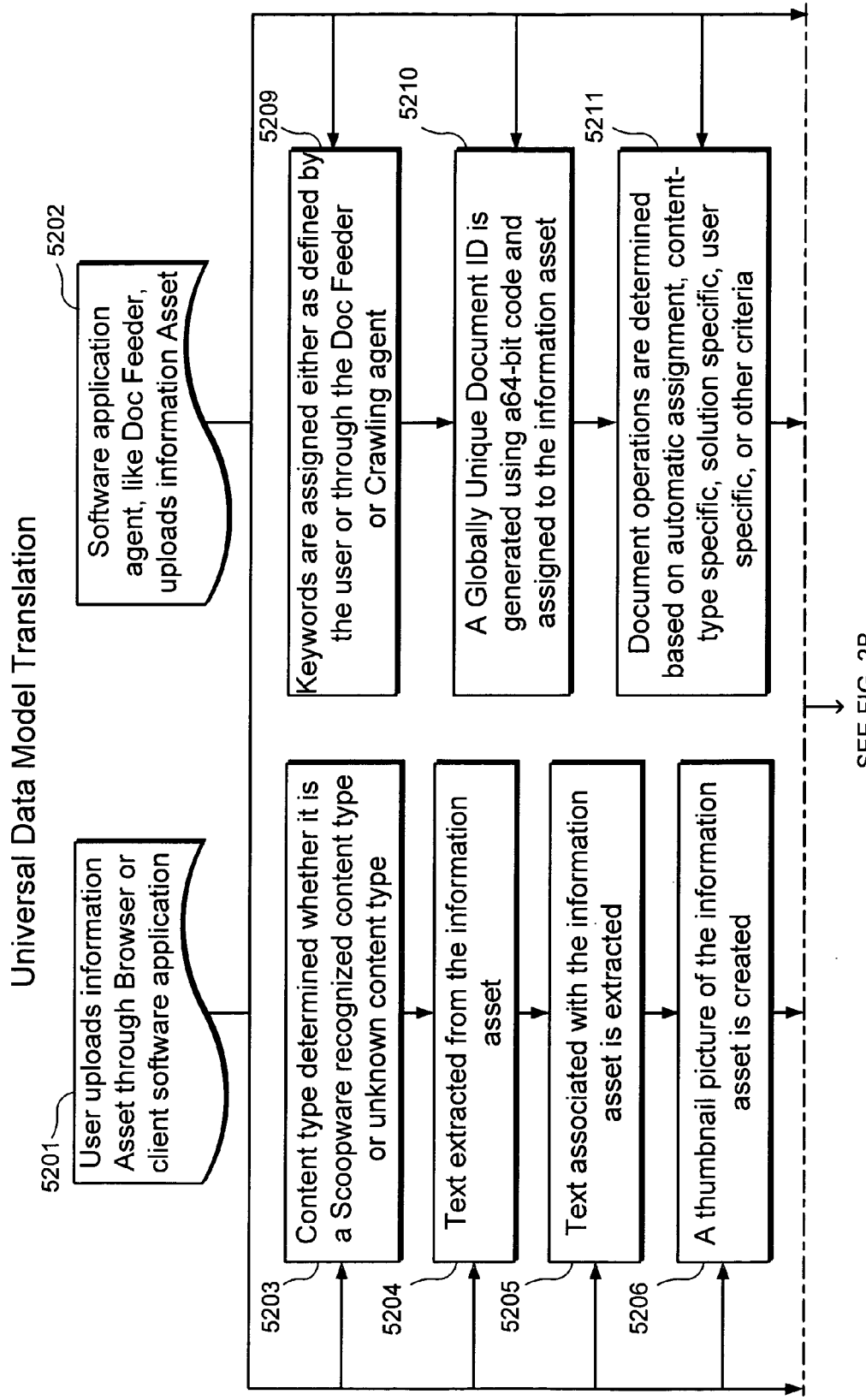
FIGS. 2-8 are flowcharts illustrating processes in an example of a preferred embodiment.
Figure 2B:
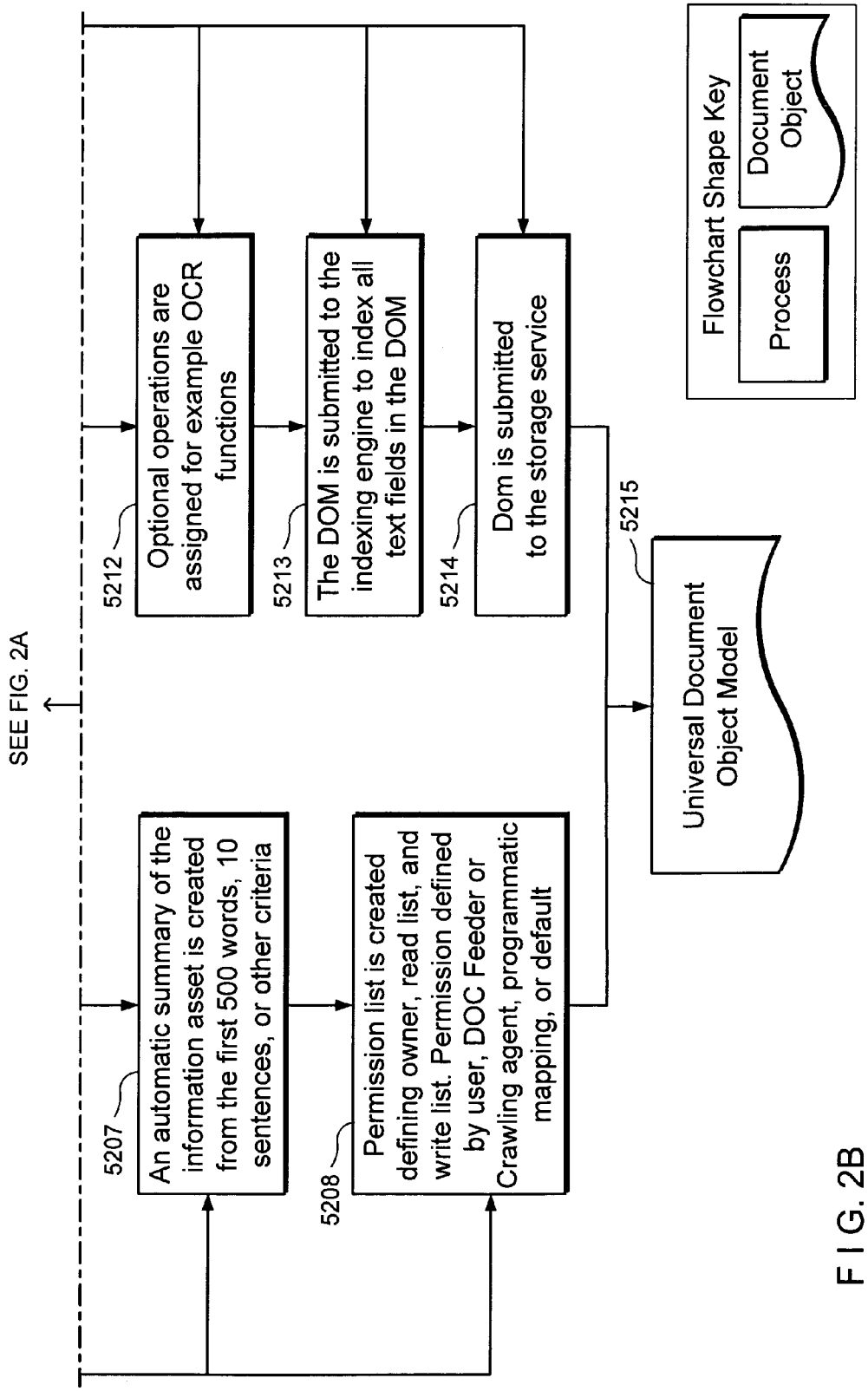

FIG. 2 illustrates creation of a universal data object model of a documents in accordance with a preferred embodiment. This is an important part of the disclosed system that helps make possible the efficient handling of heterogeneous document types in a manner that users find easy and intuitive. A document object model (DOM) can be thought of as a document shell of the information asset (IA) that contains, anon other items, a thumbnails of the information asset, permission rights, and metadata. The DOM is created from the IA and is stored in a desktop computer and/or a server, either independently of the IA itself or with a replica (copy) of the IA. From there, the system makes the DOM (with a pointer to its IA or replicated IA) to the desktop user or to users that have access to the document through some computer connection.

As seen in FIG. 2, the process of creating a DOM starts with the uploading at step S201 of information assets (documents) through a browser or a client software application, or step S202 with uploading using a software application agent called Doc Feeder in a specific embodiment of the disclosed system. At the following steps, which need not be performed in the order of their description below, a DOM of the IA is created. The IA uploaded at step S201 or S202 can comprise structured or unstructured data. At step S203 the process determines the content type of the IA, e.g., if it is a type that the system recognizes. If it is, the system includes content-type specific metadata in the document's DOM: MIME/content type information, a glyph of the application that creates/views the content-type, and/or the system assigns other content-type data to the DOM shell. If step S203 determines that the IA is an unknown content type, it assigns to the DOM a content-type for "unknown content-type.". Step S204 extracts text from the information asset, for example, in a text document, this step extracts the text of the document. Step S205 extracts text that may not be within but may be associated with the information asset, for example, the time stamp of the document, the owner of the document, and possibly other textual information that is or can be associated with the document. Other possible examples are attributes of the IA such as file reference path, database/repository path, file metrics such as size, encryption, other identification information, etc. Step S206 generates a thumbnail picture of the IA. The thumbnail can be a reduced-size picture of the document, for example of the first page, and can be converted to a graphic image format. Other examples of thumbnails are JPEG, MPEG, BMP, GIF, AVI, or other still or moving image files representative of some aspect of the IA. Step S207 produces an automatic summary of the IA, e.g., a replica of its first 500 words, or first 10 sentences, or some other information copied or otherwise derived from the IA. Step S208 creates a permission list unique to the IA that defines the owner of the IA (e.g., its creator), and lists of people or entities and groups that can access the IA or the DOM of that IA for reading and/or writing purposes. This permission list can be defined by the user for the particular IA or for a class of IAs, or can be created automatically, e.g., by software agents called Doc Feeder or Crawling agent in a particular embodiment of the described system, or by programmatic mapping such as LDAP, Active Directory, NTDS or some other mapping. Alternatively, at least for some documents, the permission list can be default setting.

Step S209 assigns keywords to the information asset. The software agents Doc Feeder or Crawler can assign keywords, and the user can manually assign or add keywords. Step S210 generates and assigns to the IA a Globally Unique Document ID, e.g. as 64 bit code unique to the IA. Step S211 determines and assigns to the IA document operations that are unique to the IA. Depending on the IA, these operations or command buttons can be basic, such as "View" and "Reply." They can be content-specific, such as "Play" for multimedia information assets. They can be solution-specific, such as "Fax" of Purchase." They can be user-specific, such as "Delete" allowed to only certain users. An important point is that the operations or command buttons assigned to a particular IA match the IA and need not be the same for different information assets, as is the typical case with traditional information management systems. Step S212 assigns optional operations or command buttons to the IA. They include, for example, commands to send the IA to an optical character recognition (OCR) service that can be a separate service, IP, HTTP-based or an asynchronous operation. Alternatively, the optional operation can be another OCR operation that can perform OCR on a selected part of the IA, or on digital graphic portions or can involve multi-part associations. At step S213, the information asset is submitted to an indexing engine (asynchronous service) Again, this can be a separate service, IP, HTTP-based. This step can index all or selected fields of the IA, including but not limited to the IA summary, title, permissions, IA text, keywords, time, metadata, and content-type. At step S214 the DOM created as described above is submitted to a storage service. This can be a database that is a file reference with a pointer to the actual location of the IA on a network or a local file system, or it can be a database that contains the actual IA in a repository such as a user's computer or a centralized repository. The document object model so generated is made available for use in step S215.

Figure 3:
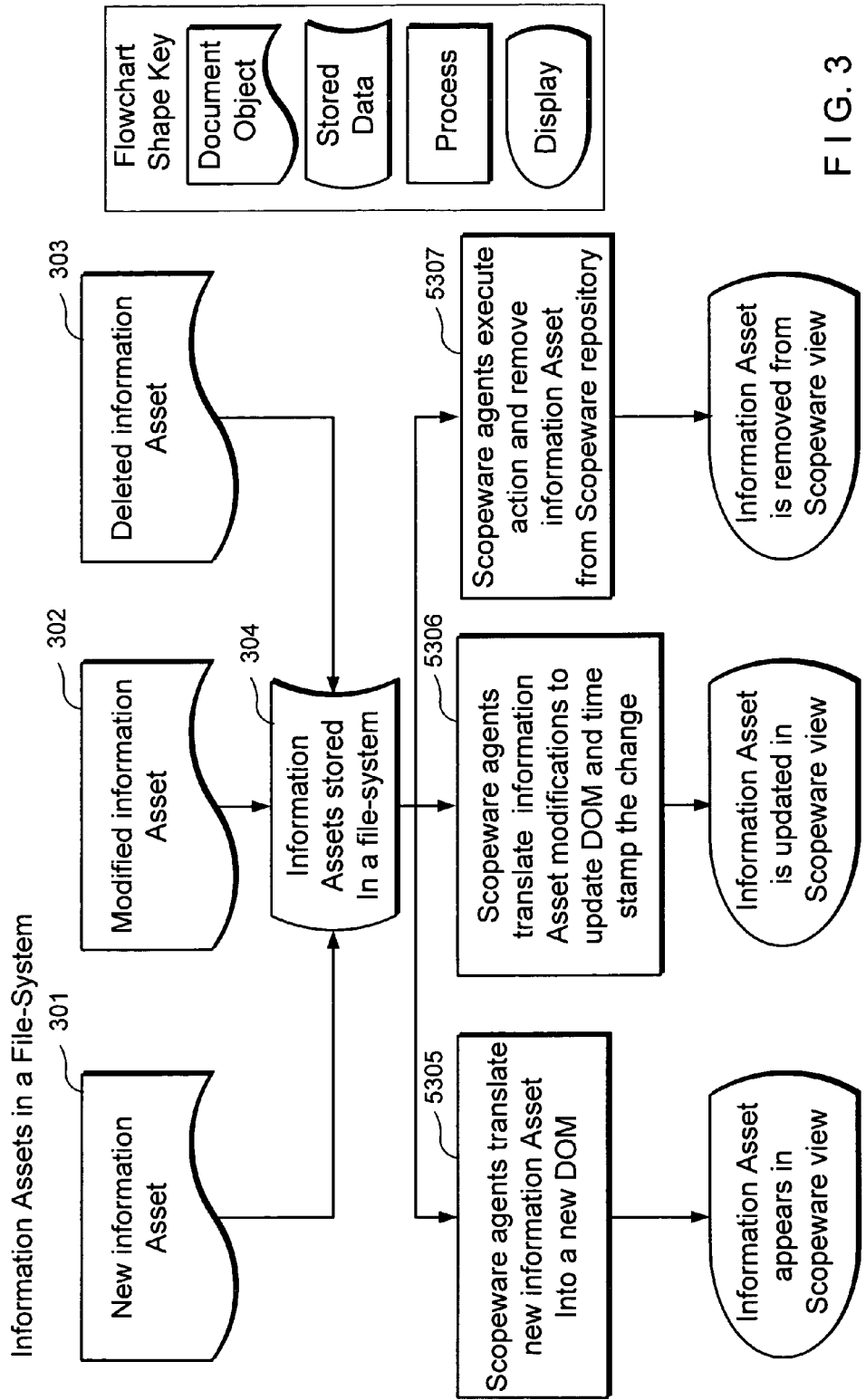
Figure 4:
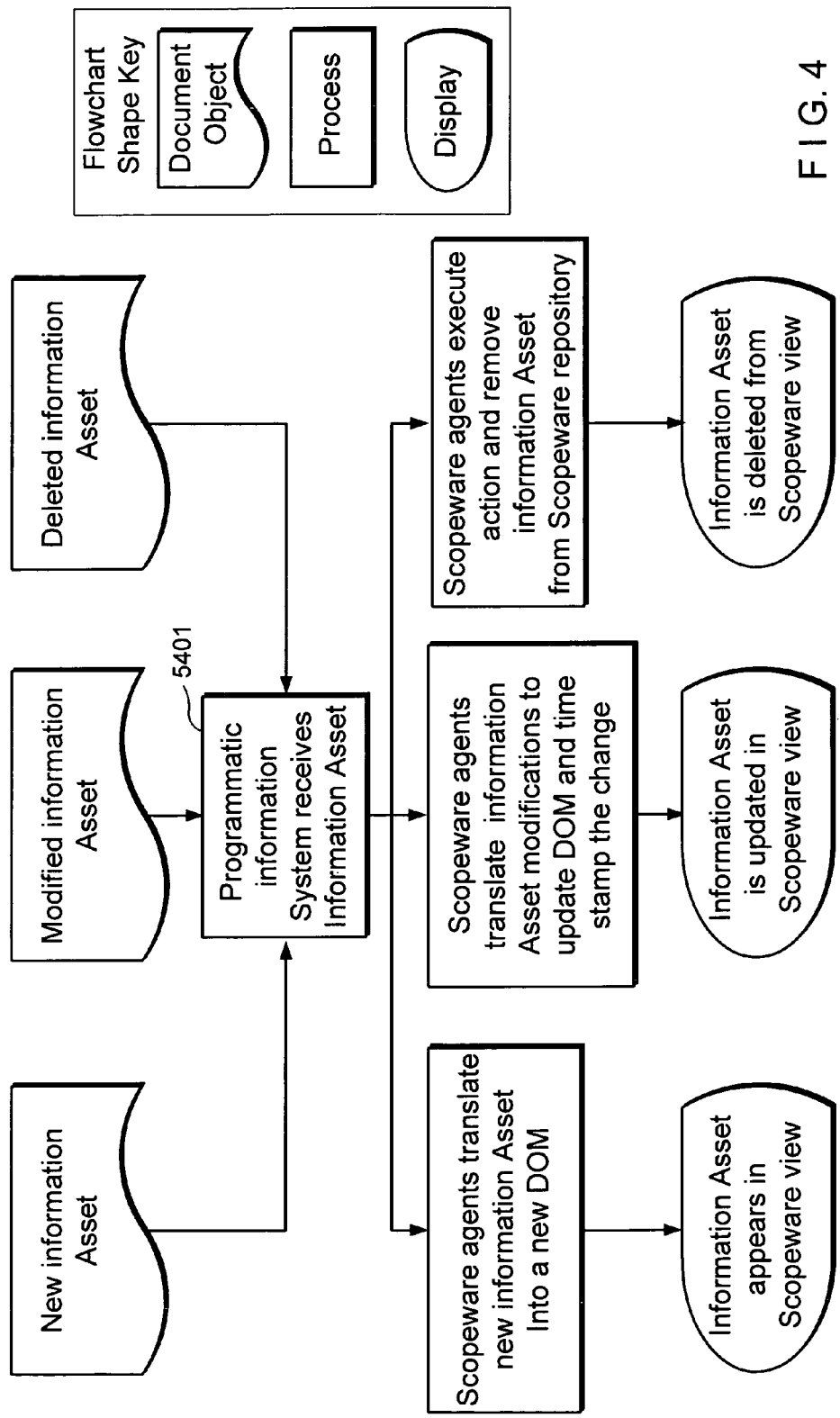

FIGS. 3 and 4 illustrate methods of creating document object models from information assets. As seen in FIG. 3, three type of information assets are involved—new information assets 301, modified information assets 301, and deleted information assets 303. All come to a file system 304. At step S305, agents specific to the disclosed embodiment of the system known as Scopeware 2.0 translate the IA into a DOM, i.e., create a DOM shell for the IA, with attributes as discussed in connection with FIG. 2. At step S306, Scopeware agents translate the IA modifications into an updated DOM and time-stamp the change so the new time-stamp becomes a part of the DOM and the modified IA can be places in the stream of documents at a place reflecting the new time-stamp. At step S307, Scopeware agents execute actions for removing the deleted IA from the repository of documents. The display, such as that seen in FIG. 1 reflects the actions takes at steps S305, S306 and S307. As a result of step S305, the stream on the display shows at 308 the new IA (provided the time period where the new IA fits is being displayed). As a result of step S306, the modified IA appears at 309 in its correct place in the displayed receding stream of documents. As a result of step S307, the deleted documents is removed at 310 from the displayed stream, and the remaining In FIG. 4, a programmatic information system received new, modified and deleted information assets for storage and distribution to appropriate translation agents as illustrated. In other respects, the FIG. 4 arrangement corresponds to that of FIG. 3, so the description of corresponding portions will not be repeated.

At least some of the document object model created as described above becomes a part of a glance view or browse card of the type illustrated in FIG. 1. An important feature of the system disclosed here is to conveniently display such a glance view in a natural and intuitively accepted way to facilitate operations.

Traditional user interfaces for computers typically present lists or graphical icons of "documents" (including but not limited to computer files, emails, web pages, images and other types of electronic information). These lists and icon displays provide only a limited amount of information about the document—typically, title and application type only, although additional information as well in some cases. This can make it difficult for users to identify the document without downloading and/or opening the document with its associated application. For example, in Windows 2000, the user interface displays a small temporary pop-up window of the document's title, application type, author and size when the user hovers his cursor on the document icon; however, the pop-up window appears only after a brief delay, usually 1-2 seconds and is for documents that are on the screen at the time, which tend to be a small part of the many documents typically stored in or accessible through a user's computer.

In contrast, the disclosed system creates a pop-up window for heterogeneous documents of known and unknown application types that appears instantly, as perceived by the user, as he/she hovers the cursor over the document's representation in the user interface. In the example of FIG. 1, this representation is an index card in a cascading flow of overlapping index cards (called "browse cards"), and the pop-up window is called a "glance view". This glance view not only contains the document's title, application type and owner, but also may contain rich multimedia cues (such as a thumbnail image of the first page of the document, a WAV or MP3 preview of an audio file, or an animated GIF preview of a video file), text summaries and document operations specific to the document's application type and access permissions. For example, if the user has write permission for a document, the "Edit" operation will be visible and available; however, if not, the Edit operation will not be visible or available. These document operations are interactive, allowing users to select available operations directly.

Figure 5:
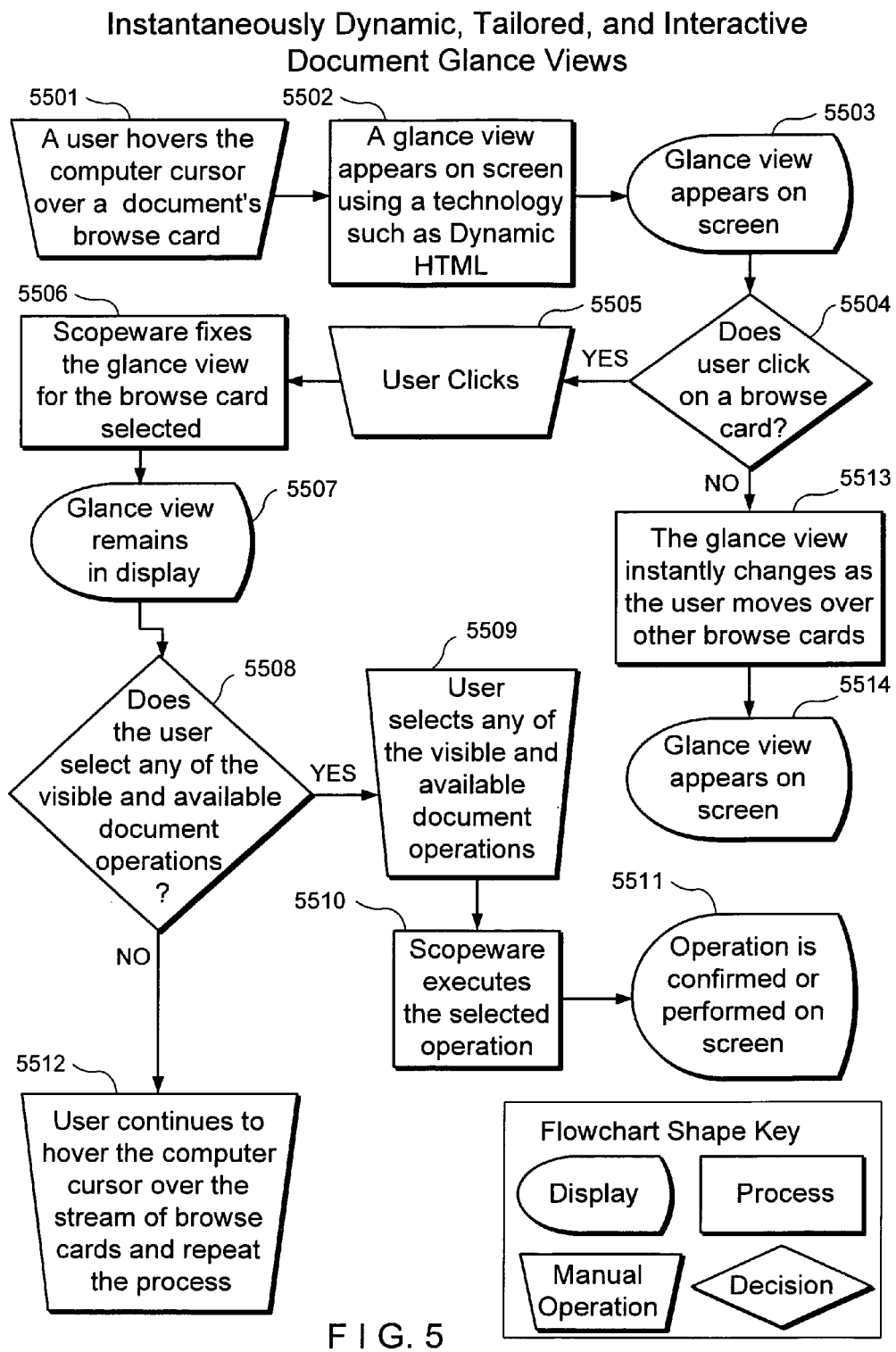

Referring to FIG. 5 for an illustration of the instantaneously dynamic, tailored, and interactive document glance view feature of the disclosed system, at S501 a user hovers his or her computer cursor over a document's browse card. Essentially instantly, at least as perceived by the user, and without any mouse clicking or other action on the part of the user, step S502 processes the information needed for a glance view to appear on the screen, and at S503 the glance view appears next to the browse card, using a technology such as Dynamic HTML. If the user clicks on a document's browse card, as detected by the test at step S504, and as executed by the user at S505, step S506 causes the glance view to become fixed and step S507 causes it to remain in the display. The glance view does not change until the user clicks on another document's browse card. If the user does not click on any browse card, as determined by the test of step S504, the glance view will instantly change as the user moves his cursor over other browse cards, to reflect the glance view of the underlying browse card. If the user has clicked on a browse card to fix the glance view as a stationary window, the user can then select any of the visible and available document operations, by taking the "yes" branch of step S508 and selecting at S509 an available operation (as earlier described, the operations or command buttons that show are specific to the document). At step S510 the system executes the selected operation (command) and the display reflects this at S511. If at step S508 the user takes the "no" branch, she can continue to hover the cursor over the stream of browse cards and repeat the process, at step S512. If at S504 the system determines that the user has not clicked to fix a glance view, the glance view information essentially instantly changes at S513 as the user moves the cursor over other browse cards, and the new glance views appear on the screen at S514.

Figure 6:
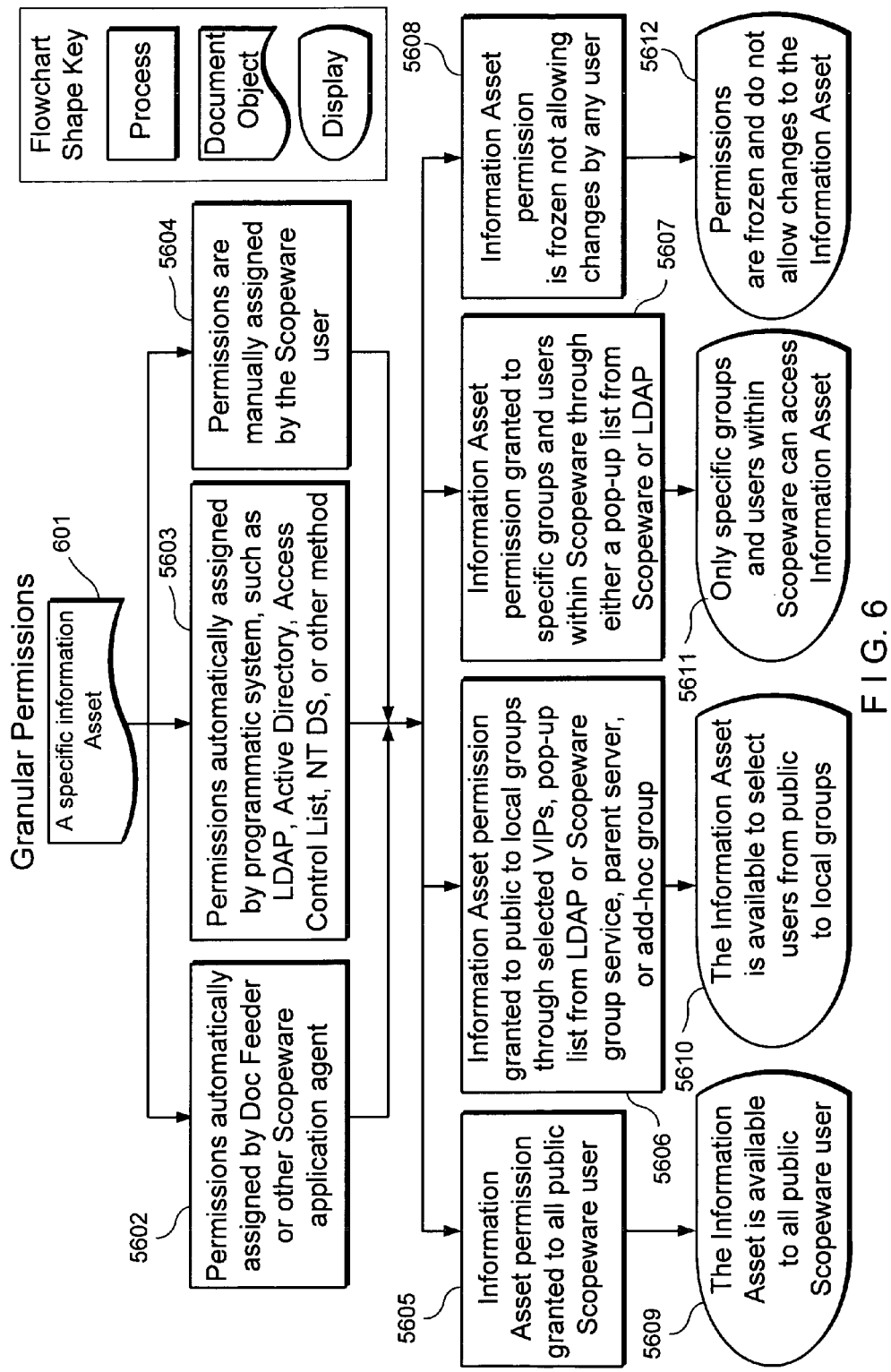

FIG. 6 illustrates a process involving another important feature of the disclosed system—granular permissions for access to information assets that allows clients to receive seamless and uniform access to contents without necessitating changes to existing network security and access rights. In traditional systems, a network administrators typically would grant access to specific network drives and file folders. The permission typically would allow a user to access the entire folder or drive, or would deny access to an entire folder or drive, rather than to a particular information asset or document.

In the disclosed system, each information asset is accessible through specific access permission for each client or designated group of clients. Examples of access stage permissions are read, write, and aware. Read permissions allow a client to view the full information asset. Write permissions allow the client to view and edit the document. Aware permission alerts the client that an information asset exists, for example by providing a document shell in the client's stream of documents, but does not allow the client to view or edit the document. A group of clients who want to collaborate on a project or event can establish a designated group that can be assigned permissions to relevant documents for the project or event. Thus, each member can receive real-time additions to his or her stream of documents and information assets are posted. The clients can assign permission to the other group members themselves, by so designating the appropriate documents to be shared, without involving a network administrator. Some documents, such as personal to-do lists, can be accessible only to a specified user, but the user can change this at any time to allow access, full or partial, to other designated persons. Assignments of permissions for access can be done as granularly as an individual client level or individual document, or as diffuse as a departmental or enterprise level.

As seen in FIG. 6, an information asset 601 can have permission levels assigned to it in several ways. At step S602, a software agent such as Doc Feeder can automatically assign permissions; at step S603 a programmatic system such as SDAP, Active Directory, Access Control Lists, NT DS, of some other system assigns permissions to the document; and/or at step S604 the user manually assigns permissions to the document. Examples of processes relevant to different types of permissions are: step S605 grants access to all public users of the system; step S606 assigns permissions to groups as illustrated; step S607 assigns permissions to specific groups as illustrated, and step S608 freezes permissions and does not allow the document to be changed. The display, of the type illustrated in FIG. 1, can provide information representative of the permissions, as illustrated at steps S609 through S612 in FIG. 6.

Figure 7:
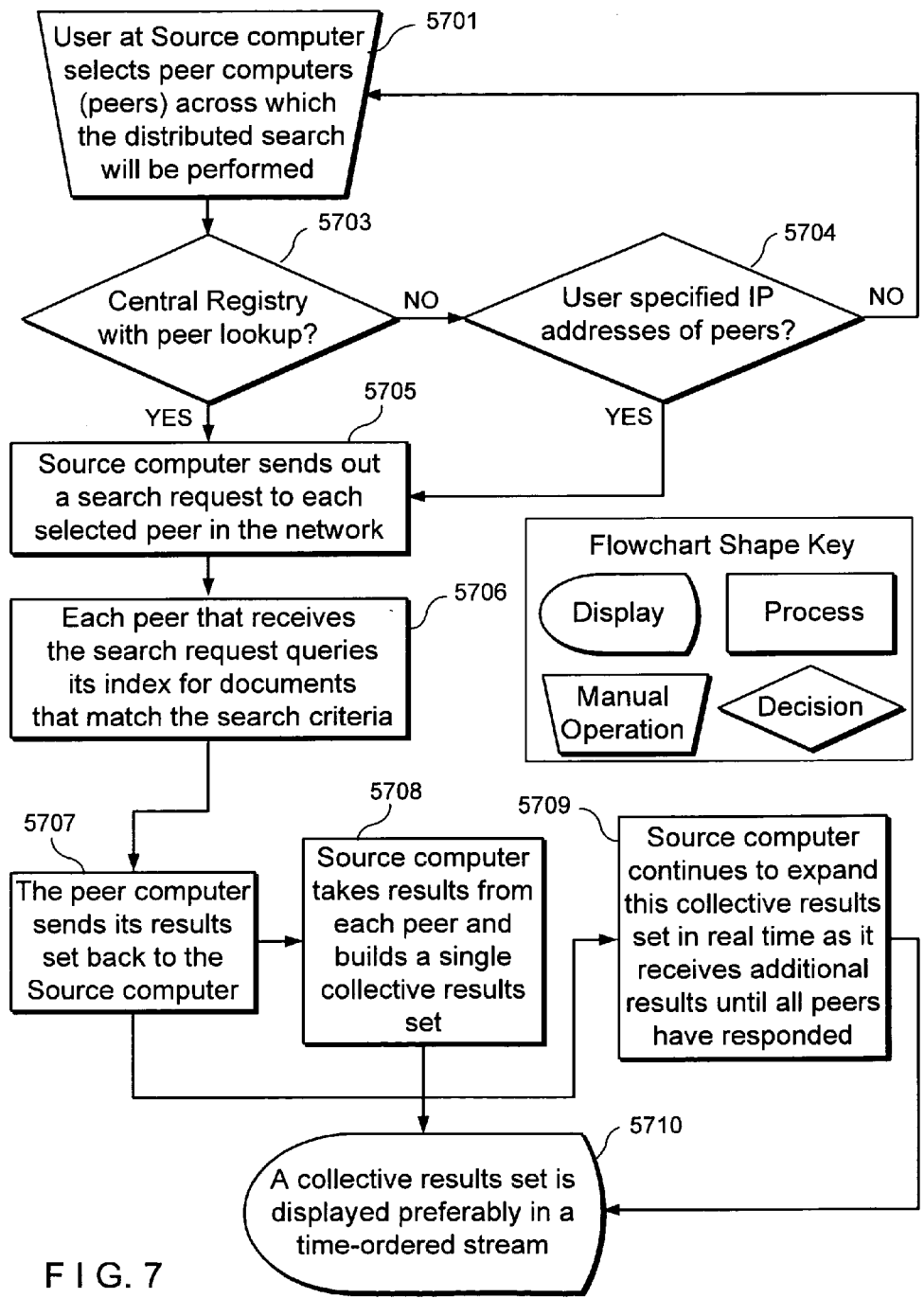

Another important feature of the disclosed system is illustrated in FIG. 7 and pertains to integrating search results from distributed searches. In traditional systems, search requests in a client/server model with a central index usually return a single, well-defined results set. In a peer-to-peer network, however, search results may come back to the "Source" computer (the computer that issues the search query) in a haphazard manner because of network latency (variable traffic speed and bandwidth across a distributed network) and variable peer presence (peer computers can be turned on and off, or removed from network at times).

The disclosed system asynchronous responses to a distributed query across a peer-to-peer network of computers to integrate the results from diverse sources, arriving at different times, and comprising diverse types of documents, into a single unified results set. One preferred embodiment leverages the time-ordered presentation interface earlier described in so that search results are integrated into a time-ordered stream according to each document's original time-stamp, regardless of when the document's search results set was received by the Source computer.

As seen in FIG. 7, at step 701 a user at a Source computer selects peer computers ("Peers") across which the distributed search will be performed. If the test at S703 determines that there is no central registry with peer hookup, and the test at S704 determines there is no user-specified IP address of peers, the process returns to S701, where the user can specify addresses or they can be provided in some other way. The central registry with lookup of Peers can involve Online/offline status, IP/DNS resolution service and Optional public/private key authentication. When the test at S703 or at S704 leads to the "yes" branch, at step S705 the Source computer sends out a search request that travels to each selected Peer in the network. At S706, each Peer that receives the search request queries its index for documents that match the search criteria, and at S707 the peer computer then sends its results set back to the Source computer. The response can be XML-based, a binary byte stream, or an in-band and out-of-band transfer. At S708 the Source computer takes the results set from each Peer and builds a single collective results set. In a preferred embodiment, this collective results set is organized as a time-ordered stream of documents, as seen in FIG. 1. This can involves an on-the-fly browser combination with XML & XSL with time-sort algorithm, XML to presentation layer with time-sort algorithm, and in-band and out-of-band transfer. Importantly, at S709, the Source computer continues to expand this collective results set, essentially in real time as it receives additional results sets from Peers until all Peers have responded or some other relevant event has taken place. At S710, the collective results are displayed as soon as results have come in at the Source computer, and the display is updated as additional results come in, even when a Peer that was off-line comes on line and sends results at a later time.

Yet another feature of the disclosed system is a particularly convenient tri-state tree. In a single scrolling tree directory of the contents of a hard drive (or hard drives in a network), a user may want to select "Parent Folders" (folders containing subfolders) and "Child Folders" (subfolders contained within a folder) that can be further operated on. This feature allows users to select folders in one or more of the following combinations:

1. All Parent Folders and all Child Folders
2. Some Parent Folders and all their Child Folders
3. Some Parent Folders and some of their Child Folders
4. No Parent Folders and no Child Folders (the do nothing option)

This selection tree has useful application beyond the particular example of information handling disclosed here; it can be used to select folders for any computer operation. For example, it can enable users to discretely select software application or operating system components to install or remove.

A single scrolling tree directory of Parent and Child Folders that can expand and contract to show the contents of Parent and Child Folders is known—Microsoft Windows Explorer is an example of one. A Tri-State Selection mechanism also is known—Microsoft Add/Remove Windows Components is an example of another way of selecting various Parent and Child Folders. However, the Microsoft Add/Remove Windows Components feature does not display all Parent and Child Folders within a single scrolling tree directory; Child Folder and other contents of a Parent Folder are displayed in a separate window only after the user clicks on a Details button. In addition, only the contents of one Parent Folder can be displayed at a time.

The Tri-State Selection Tree described here combines the elements of a single scrolling tree directory with a tri-state selection mechanism in a new and unique way to enable users to discretely select specific Parent and/or Child Folders all in one single view.

Figure 8:
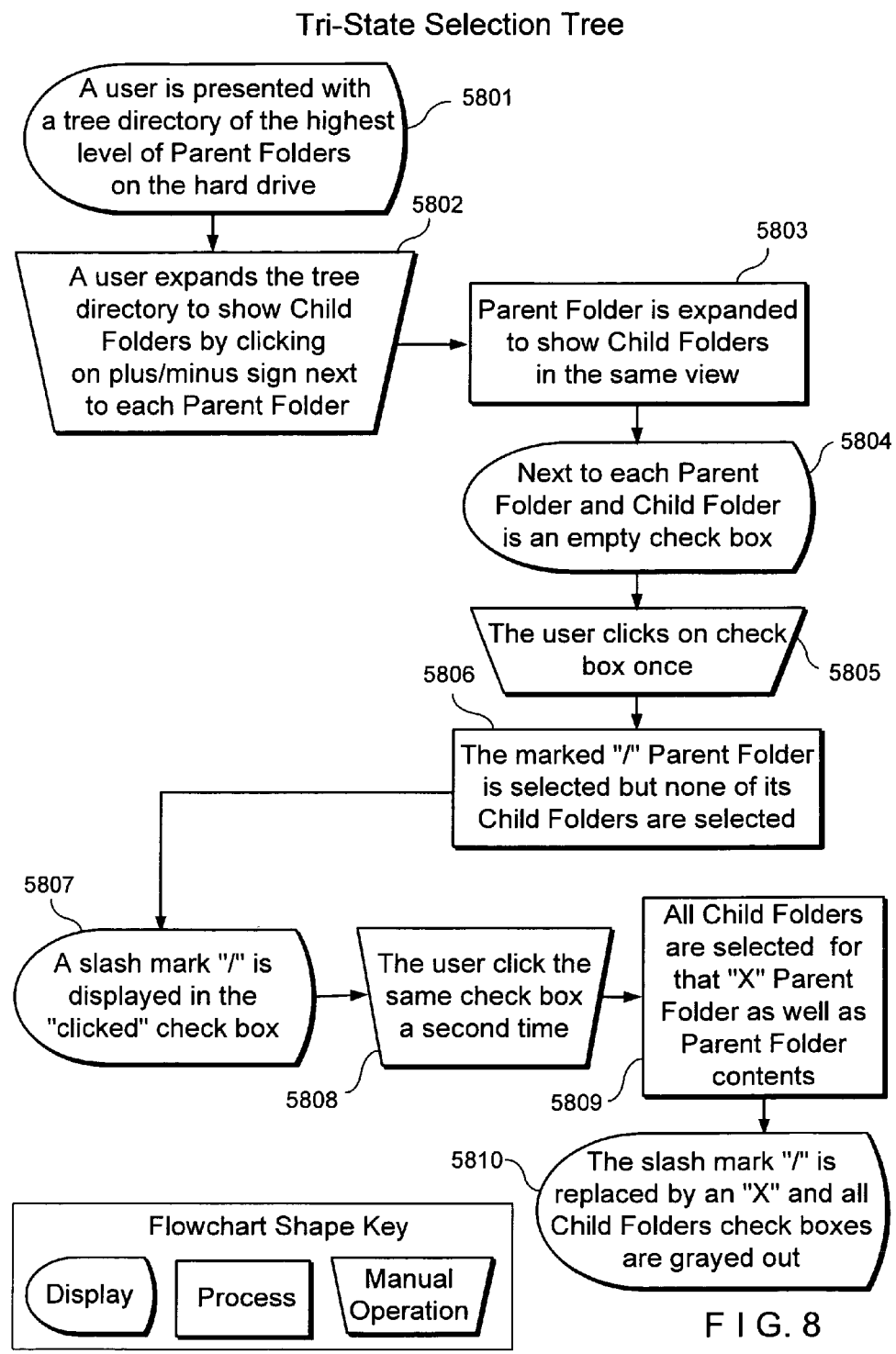

Referring to FIG. 8 for an illustration, at step S801 a user is first presented with a tree directory of the highest level of Parent Folders on a hard drive or network. At S802 the user can expand the tree directory to show Child Folders by clicking on a plus/minus sign next to each Parent Folder, and the directory so expands at S803. At S804, the display shows a check box next to each Parent Folder (e.g., to the right of the plus/minus sign). By default, all check boxes are empty, indicating that no Parent or Child Folders are selected. If at step S805 the user clicks on a check box once, the process at step S806 selects the marked "/" Parent Folder but none of its Child Folders are selected, and step S807 shows this on the display. If at step S808 the user clicks the check box a second time, the slash mark is replaced by an "X" and all the Child Folders' check boxes are then selected and grayed out at S809, indicating that all Child Folders are selected for that Parent Folder, and this is displayed at S810.

Thus, by expanding the tree and clicking on check boxes, the user can systematically and efficiently select a discrete number of folders on which to perform an operation.

Yet another feature of the disclosed system is an arrangement of a redundant array of inexpensive servers (RAIS). Processing of a large set of information or document requires benefits of a centralized architecture—reliability and scalability, and RAIS is a novel approach to provide benefits of a centralized architecture—namely reliability and scalability with numerous inexpensive computers. Thus, RAIS can deliver essentially infinite scalability, can allow inexpensive smaller computers to be used to solve enterprise computational problems rather then expensive larger platforms, cheaper/faster.

For example, consider:

Set of Information, D, with specific documents D1, D2, D3; D{D1,D2,D3}

RAIS of N×N size here with N=3; RowN,ColN

Replication factor is number of columns

Scalability factor is number of rows

1. Here N=3, with 9 computers

|  | Col1 | Col2 | Col3 |
|---|---|---|---|
| Row1 | A | A | A |
| Row2 | B | B | B |
| Row3 | C | C | C |

2. To post a Document, Dn, one copy is sent to a sub-server in each ColN, so

|  | Col1 | Col2 | Col3 |
|---|---|---|---|
| Row1 | A(Dn) | A(Dn) | A(Dn) |
| Row2 | B | B | B |
| Row3 | C | C | C |

3. Thus Dn is replicated N times (N=3) and thus if Col1: Row1 computer is unavailable there are two other computers with the same Dn. This is RAIS replication.

4. To post a universe, or set of documents, D{D1,D2,D3}, can use simple (round-robin) or complex (latency, closest path, spanning tree) routing, sending each document to a different RowN.

|      | Col1  | Col2  | Col3  |
|------|-------|-------|-------|
| Row1 | A(D1) | A(D1) | A(D1) |
| Row2 | B(D2) | B(D2) | B(D2) |
| Row3 | C(D3) | C(D3) | C(D3) |

5. Thus to reassemble the entire universe or set of documents, D, need to send a request to each RowN. To reconstruct, D, for an N×N RAIS requires N request/responses.
6. Multiple smaller requests can be used instead of one mammoth request. This reduces latency, bandwidth and process constraints. This is RAIS scalability.
7. Note that any one of the computers in Row1 can be used to re-construct the total set D found in Col1. For example, if Row1:Col1 computer is unavailable, then Row1:Col3 computer has a copy of the data. In fact, D can be constructed from any arrangement that completes a ColN.
8. To increase either replication or scalability simply increase N.

Scopeware Software Agents, either desktops or servers, can be installed on each computer in a RAIS matrix to achieve this functionality.

The disclosed system can be implemented in a variety of ways in terms of physical information storage—for example, physical information storage can be centralized or decentralized. Decentralized storage, physical storage of information with multiple servers and/or clients, is possible through network agents called Doc Feeders, which may be located at a server or client level. The Doc Feeder allows a storage location of a client, for example a file folder on a desktop hard drive, to be included in the system level data repository for use throughout an organization or enterprise. Depending upon implementation, the Doc Feeders can replicate the information asset (IA) to a server or maintain a constant pointer to the physical storage location while populating the system with the document object model (DOM). As earlier described, a DOM is a document shell of the IA that contains, among other items, a thumbnail of the IA, permission rights, and metadata. A DOM is created from the IA and placed on the Scopeware server, either independent of the IA or with a replication of the IA. From there, the Scopeware server will share the DOM (with constant pointer to the IA or replicated IA) with other connected system servers and clients in order to make the IA available to all clients connected to the network. Thus, the system servers and network agents (Doc Feeders) act as document proxies for both storage and retrieval of IAs.

In addition, the system servers within the network need not be physically close in proximity. For example, a client in a truly global organization with locations and system servers on several continents can query and retrieve sales results across all system servers and clients through a federated search. In essence, the disclosed system creates a virtual store from all documents accessible to any system server or client either centralized or decentralized.

The physical information storage of the disclosed system follows three models: duplication, replication, and document reference. The duplication model physically stores a duplicate IA on the parent Scopeware server that was created by the client. Other clients polling the parent Scopeware server have full access to the IA, depending upon permissions, whether or not the original document is available from its native storage location (i.e. client PC is turned off). The replication model replicates the IA from the parent Scopeware server to the peer Scopeware servers within a federated network. All clients within the federated network have full access to the IA, depending upon permissions, whether or not the original document is available from its native storage location (i.e. client PC is turned off). An example of the replication model is the concept of a redundant array of inexpensive servers. This concept, which is described in detail in the distributed enterprise model, utilizes client machines in place of a singe server. The document reference model "parks" only a DOM of the IA on all Scopeware servers and maintains a constant pointer to the actual physical location of the IA rather than storing a full copy of the IA on the Scopeware server. Other clients will only be able to gain access to the IA when the physical location of the IA is connected to the network (i.e. client PC is turned on).

There are to primary types of streams in accordance with the disclosed system: Bottom-Up and Top-Down. Through the use of both Bottom-Up and Top-Down methodologies, Scopeware creates a living stream for the client with new DOMs appearing automatically as content arrives. The Scopeware distributed enterprise model can make use of both server-based resources and client-based resources where appropriate. Both types of streams can be used simultaneously and interchangeably.

Figure 9:
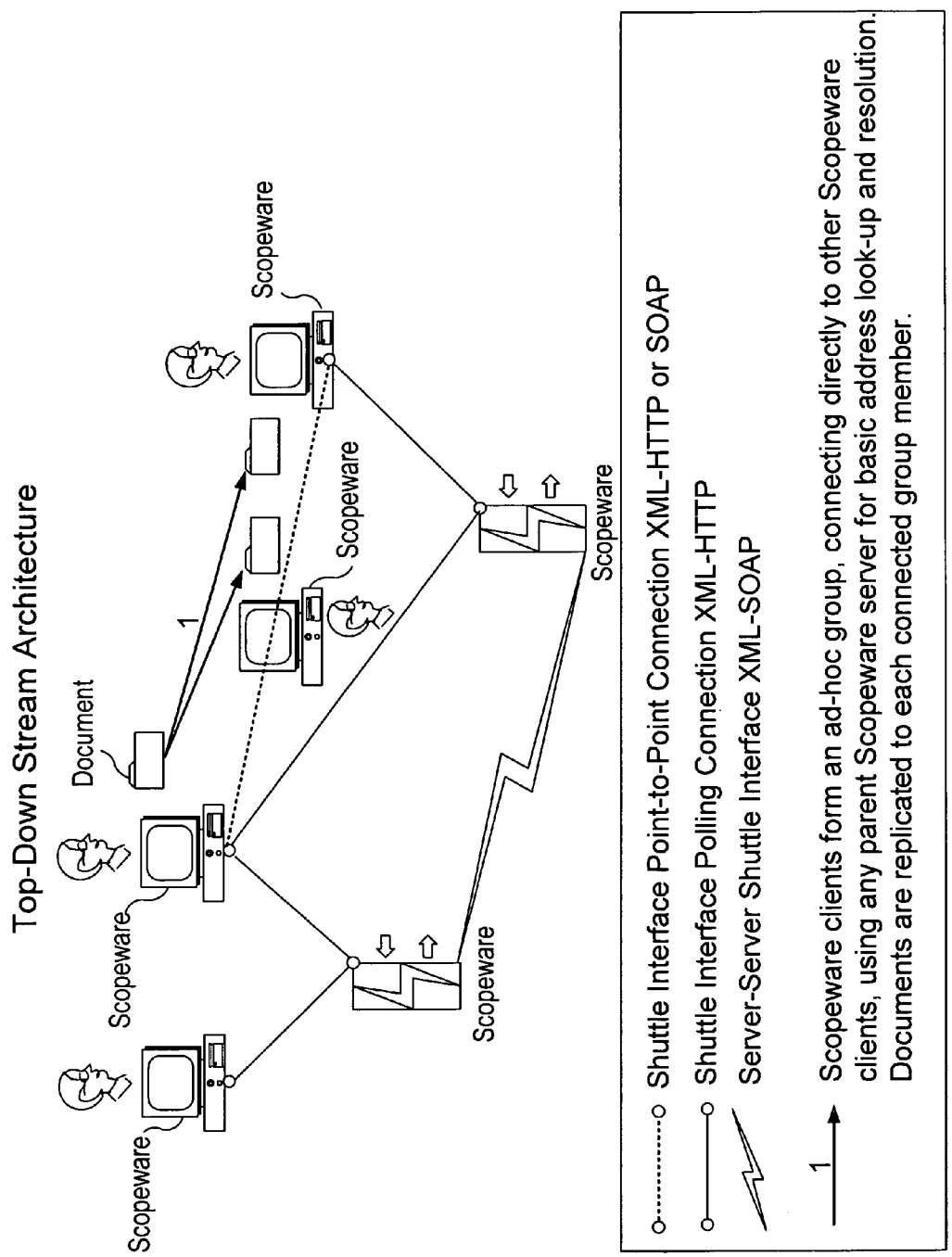

Bottom-Up streams are comprised of information collaboration formed by ad-hoc groups of Scopeware clients. A bottom-up stream is composed of information created by the clients of a transitory group. Information shared and created by this group is be replicated via point-to-point connections (i.e. from client PC to client PC). In this way, bottom-up groups can form and disperse frequently, and without notification, while its members will still have access to the shared information. FIG. 9 illustrates this configuration.

Top-Down streams are more permanent, generally more administrative streams or collections of information, such as company-wide distribution lists, or groups like 'Accounting' and 'Development'. In these groups, information is "parked" to the server from the desktop. The server then sends the information to other known servers. Each client maintains a polling connection to the server to retrieve "parked" documents that have recently arrived from other remote servers or from local clients. FIG. 10 illustrates this configuration.

As earlier described, the user interface within the Scopeware product portfolio has unique characteristics. The DOM provides certain information that allows quick perusal of the information retrieval results via a proprietary "browse card" or "glance view" which is similar to an index card that contains data on the underlying IA. A unique "browse card" or "glance view" is created for each IA. The "browse card" or "glance view" includes metadata for the document, which is comprised of a title, identification number unique to Scopeware document referencing, date/time stamp, and owner information. The "browse card" or "glance view" also presents a thumbnail image of the IA and a summary of the IA contents. Finally, the "browse card" or "glance view" contains a list of operations appropriate for the IA's application that include, but are not limited to, copy, forward, reply, view, and properties.

The "browse card" or "glance view" arrives in the stream of those clients that have permission to view the IA. The owner can grant access to other clients or groups by granting read, write, or aware permissions through the properties of the "browse card" or "glance view." Permission can be granted as granular as an individual-by-individual basis from the DOM, or through predetermined administrative groups via the Scopeware server.

The "browse card" or "glance view" is presented in a time-ordered sequence starting in the present going back into the past. The "browse card" or "glance view" is available in a number of views. The primary view is the stream. Other formats include a grid, Q, list, and thumbnails. The various views address the client's personal preferences for accessing time-ordered content in their most logical way. These views all contain the information presented in a "browse card" or "glance view" but are organized in a different method. Other specialized views include the address book and calendar.

An advantage of the "browse card" or "glance view" approach is the ease of browsing, searching, and retrieving IAs. In the stream view, the "browse card" or "glance view" of each IA are aligned much like cards in a recipe box. For each item, the title and application icon are viewable on the "browse card" or "glance view" in the stream. When the client passes over the "browse card" or "glance view" in the stream with the mouse pointer, the full "browse card" or "glance view" is presented to the client for easy viewing. From the "browse card" or "glance view," the client can perform any of the aforementioned actions available to the IA, subject to permission access.

The disclosed system is suitable for a number of computing models servicing multiple clients including a single departmental server model, an enterprise server model, a distributed enterprise model, and a peer-to-peer model (absent a dedicated Scopeware server or common server). In addition, the software enables wireless computing independent of or in conjunction with any or all of the aforementioned models. Wireless clients include WAP enabled phones, PDAs, Pocket PCs, and other similarly capable devices capable of receiving and transmitting data across a network. All of the Scopeware Implementation Models make use of the components previously discussed, providing consistent interface available across different computing topologies, from monolithic single servers to peer-to-peer collaboration.

Access to the IA contained in the Scopeware repository can be achieved through two methods. The first method of access is through the thin-client method. The thin-client method utilizes a web browser, such as Microsoft's Internet Explorer or Netscape's Navigator, on the client device to gain access to the Scopeware repository residing on the Scopeware server. The second method of access is the desktop-client method. The desktop-client method involves a local installation of Scopeware on the client device. The client device is then capable of performing the storage, retrieval, extraction, and processing of IAs as they are introduced to the Scopeware repository. All the models below can utilize either method of access to the Scopeware repository, however the distributed enterprise and peer-to-peer models are optimized with the desktop-client method.

Single Server Model. A single server model makes content on one Scopeware server available to any client connected to the departmental server. The Scopeware software creates a unique DOM that represents to the user interface the relevant details of the IA physically stored by the server or client. Thus, when a client connected to the network requests access to and retrieval of IAs through scopeware, the client can view all documents contained within the network that satisfy the query parameters and access restrictions regardless of the document's native application. The documents available include those stored locally by the client, those saved to a central storage location, and those stored by peer clients with Doc Feeders connected to the shared server Enterprise Server Model. In an enterprise server model, where multiple Scopeware servers are installed, federated access to and retrieval of IAs across the network is enabled. In federated information sharing, a client asks one Scopeware server for IAs that may reside on it or one of many connected peer Scopeware servers. In this model, the actual IA may reside on any network-connected client, the Scopeware server, or a centralized data storage location. Transparent to the client, the Scopeware servers shuffle the retrieval request and access restrictions to present a single, coherent stream to the client via the presentation architecture previously discussed (within the original patent document).

Distributed Enterprise Model. A distributed enterprise model utilizes the clients for storage, retrieval, and processing of IAs. Through the use of directory monitoring agents, similar to network agents, the physical location of an IA need not be on the Scopeware server, but rather can reside with any client. The Scopeware servers take on a secondary role as administration servers and content parking lots. This model pushes the processing tasks to the clients while using the servers to shuttle IAs throughout the enterprise. The indexing engine, thumbnailing engine, lightweight storage database will be based at the clients.

Taking Scopeware beyond distributed networking and the federated architecture—into a more distributed approach will be straightforward, given the way that the system has been designed. Key elements of the next stage of deployment are distributed document processing and scalable server arrays.

Distributed document processing consists of two different approaches. First, when information was created physically on a desktop machine, but was part of a larger application and intended for storage on a server (rather than on the desktop), the Desktop facilities could do the document extraction, indexing, thumbnailing, etc., and post the results to the Scopeware Server. Second, a Scopeware Server that was handed a document (perhaps from an OCR process or from a central email application) could hand the document off to an available Scopeware Desktop for the same processing. These strategies relieve the processing load on the Scopeware Server and leave it free to focus on handling searches and stream integration, allowing a given Scopeware Server to handle a much larger user load.

When an organization needs to support central processing of large document bases—and needs the reliability, accessibility and security of a centralized architecture—Scopeware Servers will support deployment in a novel architecture we have named RAIS—a redundant array of inexpensive servers.

In this architecture, imagine a square array of desktop machines—call each one a "sub-server." The array as a whole comprises the Scopeware Server. (This does not require wiring together an actual array or cluster; any interconnect such as a Ethernet sub-net or even HTTP over a broader network will work.) In these arrays, columns of servers provide redundancy for storage, while rows (within columns) provide redundant points of distribution.

To post document D, one copy of D is sent to a sub-server in each column of the array. To replicate everything five times such that losing any data requires the loss of five sub-servers, five columns are used. The number of columns in the array is managed to support exactly the degree of replication (and redundancy) desired. The write processes can be managed in a number of ways to ensure that the different rows in the columns are balanced.

To send a polling message or search request ("give me all the latest stuff"), a request is sent to each sub-server in one column (note that the means to do this transparently to the user is an extension of the federated search technology). Each column of sub-servers absorbs one copy of every posting (because any write has gone into at least one row of the column); therefore, all the sub-servers in any one column collectively have copies of everything. Just a "replication factor," is chosen for data redundancy, a "distribution factor" is chosen for responsiveness and for data management, representing the number of rows in any column. To get ten small responses to a search request instead of one big response, or to distribute the total data-storage burden over ten machines instead of one, the array is implemented with ten sub-servers in every column.

The entire "Server" can be run with only one row (resulting in replication, but no distribution) or with only one column (resulting in distribution but no replication). In the limit, row size=column size=1, and the effect is to have a single conventional server.

This approach to distributed processing, scalability and reliability for large applications allows arbitrary sets of "smaller" computers (single/dual processor, inexpensive memory and disk storage) to be used in place of very large, expensive machines. This allows the application platform to be designed to the reliability and access requirements of the particular application, and then scaled incrementally (by adding more small machines into the array) as the actual application grows in terms of users served or information managed.

Distributed document processing and server arrays will give Scopeware almost infinite scalability while maintaining compatibility with early solutions or architectures. In addition to adding greater reliability, this architecture will support very large information processing applications. This will allow enterprise-scale, top-down applications—inbound support/sales email handling, customer service or even IRS-scale tax document processing.

Distributed document processing (with Scopeware Desktop) could be combined with either a "conventional" (1 processor array) Scopeware Server or with a more powerful array. This will allow organizations to create departmental or workgroup level solutions that can grow into enterprise applications if necessary.

At the same time, the system will allow users themselves to create self-organizing applications based on their specific and current needs. Ad hoc teams can create collaborative spaces that cross organizational boundaries if necessary. These applications can leverage either Scopeware Desktops or departmental-level Scopeware Servers.

Because the system has the architecture and capacity to support any level of centralization or decentralization concurrently, applications and their platforms can be engineered centrally or grown organically, and they can be tailored to the needs of their users and the organization on an ongoing basis.

Peer-to-Peer Model. The peer-to-peer (P2P) model allows multiple clients to share IA directly without the use of a dedicated Scopeware server. The P2P model allows for pure ad hoc collaboration among Scopeware clients. For example, a client can share IA via the Internet with identified Scopeware clients that have permission to access IA from the client, and vice versa. This is similar to the distributed enterprise environment except the dedicated Scopeware server has been removed as a storage, retrieval, and connection mechanism. Instead, Scopeware clients will connect point-to-point with other Scopeware clients through a general network connection such as the Internet.

Using P2P, a client can create a virtual shared stream that looks as though it is stored on a server but is in fact stored only by many clients. Historically, all clients would need access to a shared file folder on a common server in order to share information. With Scopeware, clients can share information that is located on each other's device and are not restricted to a common server or single physical storage location. To illustrate, five clients of Scopeware want to create a shared virtual stream to support a project. They call their group "Team One." Then, when any member of "Team One" posts a document to his or her stream, and marks it "readable by Team One," the system automatically sends a copy to every Scopeware client on the "Team One" list. Each Scopeware client receiving this document pops it into its client's local stream. Thus information created by a client who is a member of "Team One" (and flagged for Team One by the owner) winds up in the local stream of every member of Team One, whether the post is a document, an event (team meeting), task, or contact. It's as if he had sent his posting to a "client" server, and then everyone had polled the server, but in fact there's no server.

The invention claimed is:

1. A method of operating a computer system comprising:
providing the computer system with documents from diverse applications in respective formats unique to the respective applications;
causing the computer system to automatically, without user interaction and without requiring a user to designate directory structures or other pre-imposed document categorizations structures, store the provided documents as a time-ordered main stream of documents associated with respective automatically generated time indicators;
said time-ordered main stream being unbounded to thereby accommodate documents associated with time indicators related to past, present and future times;
said time-ordered main stream requiring no fixed beginning or end and being maintained and being selectively retrievable and searchable by the computer system;
said computer system maintaining the main stream live and responsive to subsequent events by automatically incorporating therein new documents as provided to the computer system while maintaining the thus expanded main stream time-ordered;
providing selected search criteria;
causing said computer system to search said time-ordered main stream according to said search criteria and use search results to create a time-ordered substream of documents from the main time-ordered stream;
further causing said computer system to maintain said substream live and responsive to subsequent events by automatically incorporating therein new document provided to the computer system that meet the search criteria while maintaining the thus expanded substream time-ordered;
displaying at least selected portion of the live main stream or substream on computer display means as a display reflecting the time-ordered nature thereof;
automatically showing on the display means a display of a glance view of a displayed document in response to touching with a cursor a screen area associated with the document;
said glance view being an abbreviated version of the document and indicative of content thereof; and
said showing of the glance view occurring essentially instantaneously in response to said touching with the cursor of the screen area associated with the document.

2. A method of operating a computer system as in claim 1 in which said displaying comprises displaying respective representations showing content of at least some of the documents in the substream.

3. A method of operating a computer system as in claim 2 in which said displaying comprises displaying, as said representations, abbreviated versions of the respective documents.

4. A method of operating a computer system as in claim 3 in which said displaying comprises displaying said representations as a receding, foreshortened stack of representations of documents.

5. A method of operating a computer system as in claim 1 in which said displaying comprises displaying at least some of the documents in the substream in the form of a card gallery of document representations showing document content.

6. A method of operating a computer system as in claim 1 in which the displayed glance view of a displayed document comprises buttons for operations unique to the type of the displayed document, said buttons when touched by a cursor initiating computer system operations related to said document.

7. A method of operating a computer system as in claim 1 including utilizing subsystems from another operating system in carrying out at least some of the steps of the method.

8. A method of operating a computer system as in claim 7 in which the another operating system comprises one of a Windows operating system and an Apple operating system.

9. A method of operating a computer system as in claim 1 wherein said documents reside as respective time ordered streams in at least one server and in a number of personal computers selectively communicating with each other and with the server, and said method comprises using one of the personal computers to search a number of said respective streams in order to create a time-ordered substream.

10. A computer readable medium tangibly embodying a program of instructions executable by a computer system to cause the computer system to perform a method comprising:
providing the computer system with documents from diverse applications in respective formats unique to the respective applications;
causing the computer system to automatically, without user interaction and without requiring a user to designate directory structures or other pre-imposed document categorizations structures, store the provided documents as a time-ordered main stream of documents associated with respective automatically generated time indicators;
said time-ordered main stream being unbounded to thereby accommodate documents associated with time indicators related to past, present and future times;
said time-ordered main stream requiring no fixed beginning or end and being maintained and being selectively retrievable and searchable by the computer system;
said computer system maintaining the main stream live and responsive to subsequent events by automatically incorporating therein new documents as provided to the computer system while maintaining the thus expanded main stream time-ordered;
providing selected search criteria;
causing said computer system to search said time-ordered main stream according to said search criteria and use search results to create a time-ordered substream of documents from the main time-ordered stream;
further causing said computer system to maintain said substream live and responsive to subsequent events by automatically incorporating therein new document provided to the computer system that meet the search criteria while maintaining the thus expanded substream time-ordered;
displaying at least selected portion of the live main stream or substream on computer display means as a display reflecting the time-ordered nature thereof;
automatically showing on the display means a display of a glance view of a displayed document in response to touching with a cursor a screen area associated with the document;
said glance view being an abbreviated version of the document and indicative of content thereof; and
said showing of the glance view occurring essentially instantaneously in response to said touching with the cursor of the screen area associated with the document.

11. A computer readable medium tangibly embodying a program of instructions executable by a computer system to cause the computer system to perform a method as in claim 10 in which said displaying comprises displaying respective representations showing content of at least some of the documents in the substream.

12. A computer readable medium tangibly embodying a program of instructions executable by a computer system to cause the computer system to perform a method as in claim 11 in which said displaying comprises displaying, as said representations, abbreviated versions of the respective documents.

13. A computer readable medium tangibly embodying a program of instructions executable by a computer system to cause the computer system to perform a method as in claim 12 in which said displaying comprises displaying said representations as a receding, foreshortened stack of representations of documents.

14. A computer readable medium tangibly embodying a program of instructions executable by a computer system to cause the computer system to perform a method as in claim 10 in which said displaying comprises displaying at least some of the documents in the substream in the form of a card gallery of document representations showing document content.

15. A computer readable medium tangibly embodying a program of instructions executable by a computer system to cause the computer system to perform a method as in claim 10 in which the displayed glance view of a displayed document comprises buttons for operations unique to the type of the displayed document, said buttons when touched by a cursor initiating computer system operations related to said document.

16. A computer readable medium tangibly embodying a program of instructions executable by a computer system to cause the computer system to perform a method as in claim 10 including utilizing subsystems from another operating system in carrying out at least some of the steps of the method.

17. A method computer readable medium tangibly embodying a program of instructions executable by a computer system to cause the computer system to perform a method as in claim 16 in which the another operating system comprises one of a Windows operating system and an Apple operating system.

18. A computer readable medium tangibly embodying a program of instructions executable by a computer system to perform a method as in claim 17 wherein said documents reside as respective time ordered streams in at least one server and a number of personal computers selectively communicating with each other and with the server, and said method comprises using one of the personal computers to search a number of said respective streams in order to create a time-ordered substream.

19. A computer system comprising:
inputs providing the computer system with documents from diverse applications in respective formats unique to the respective applications;
a processing system causing the computer system to automatically, without user interaction and without requiring a user to designate directory structures or other pre-imposed document categorizations structures, store the provided documents as a time-ordered main stream of documents associated with respective automatically generated time indicators;

said time-ordered main stream being unbounded to thereby accommodate documents associated with time indicators related to past, present and future times;

said time-ordered main stream requiring no fixed beginning or end and being maintained and being selectively retrievable and searchable by the computer system;

said computer system maintaining the main stream live and responsive to subsequent events by automatically incorporating therein new documents as provided to the computer system while maintaining the thus expanded main stream time-ordered;

a source providing selected search criteria;

said processing system causing said computer system to search said time-ordered main stream according to said search criteria and use search results to create a time-ordered substream of documents from the main time-ordered stream;

said processing system further causing said computer system to maintain said substream live and responsive to subsequent events by automatically incorporating therein new document provided to the computer system that meet the search criteria while maintaining the thus expanded substream time-ordered;

said computer system:

displaying at least selected portion of the live main stream or substream on computer display means as a display reflecting the time-ordered nature thereof;

automatically showing on the display means a display of a glance view of a displayed document in response to touching with a cursor a screen area associated with the document;

said glance view being an abbreviated version of the document and indicative of content thereof; and said showing of the glance view occurring essentially instantaneously in response to said touching with the cursor of the screen area associated with the document.

20. A computer system as in claim 19 in which said displaying comprises displaying respective representations showing content of at least some of the documents in the substream.

21. A computer system as in claim 20 in which said displaying comprises displaying, as said representations, abbreviated versions of the respective documents.

22. A computer system as in claim 21 in which said displaying comprises displaying said representations as a receding, foreshortened stack of representations of documents.

23. A computer system as in claim 19 in which said displaying comprises displaying at least some of the documents in the substream in the form of a card gallery of document representations showing document content.

24. A computer system as in claim 19 in which the displayed glance view of a displayed document comprises buttons for operations unique to the type of the displayed document, said buttons when touched by a cursor initiating computer system operations related to said document.

25. A computer system as in claim 19 in which said processing system utilizes subsystems from another operating system.

26. A computer system as in claim 25 in which the another operating system comprises one of a Windows operating system and an Apple operating system.

27. A computer as in claim 26 in which said documents reside as respective time ordered streams in at least one server and a number of personal computers selectively communicating with each other and with the server, and said processing system causes one of the personal computers to search a number of said respective streams in order to create a time-ordered substream.

* * * * *